United States Patent
Oya

(10) Patent No.: US 12,265,339 B2
(45) Date of Patent: Apr. 1, 2025

(54) IMAGE FORMING APPARATUS, CONTROL METHOD THEREOF, AND STORAGE MEDIUM FOR CORRECTING VARIATIONS IN LIGHT AMOUNT FROM LIGHT SOURCE

(71) Applicant: CANON KABUSHIKI KAISHA, Tokyo (JP)

(72) Inventor: Masashi Oya, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/116,360

(22) Filed: Mar. 2, 2023

(65) Prior Publication Data
US 2023/0280672 A1 Sep. 7, 2023

(30) Foreign Application Priority Data

Mar. 3, 2022 (JP) .................................. 2022-032853

(51) Int. Cl.
G06F 3/12 (2006.01)
G03G 15/01 (2006.01)
G03G 15/04 (2006.01)
G03G 15/043 (2006.01)
H04N 1/401 (2006.01)
H04N 1/405 (2006.01)

(52) U.S. Cl.
CPC ....... *G03G 15/043* (2013.01); *G03G 15/0115* (2013.01); *G03G 15/04027* (2013.01); *G03G 15/04054* (2013.01); *G06F 3/1208* (2013.01); *G06F 3/1254* (2013.01); *G03G 2215/0407* (2013.01); *G03G 2215/047* (2013.01); *H04N 1/4015* (2013.01); *H04N 1/405* (2013.01)

(58) Field of Classification Search
CPC ........... G03G 15/043; G03G 15/04054; G03G 15/04027; G03G 15/0115; G03G 2215/0407; G03G 2215/0409; G03G 2215/0426; G03G 2215/0429; G03G 2215/047; G03G 15/5041; G06F 3/1208; G06F 3/1254; H04N 1/40031; H04N 1/4015; H04N 1/405
See application file for complete search history.

(56) References Cited

U.S. PATENT DOCUMENTS

| 4,581,617 A * | 4/1986 | Yoshimoto ......... H04N 1/40037 347/240 |
| 5,739,841 A * | 4/1998 | Ng ....................... H04N 1/4015 347/240 |
| 2007/0024912 A1 * | 2/2007 | Inoue ................... G03G 15/043 358/3.06 |

FOREIGN PATENT DOCUMENTS

JP 2018-151566 A 9/2018

* cited by examiner

*Primary Examiner* — Arlene Heredia
*Assistant Examiner* — Laura Roth
(74) *Attorney, Agent, or Firm* — Venable LLP

(57) ABSTRACT

An electrophotographic image forming apparatus, which utilizes a line head in which a plurality of light-emitting elements is arranged as a light source, includes at least one controller having at least one processor and at least one memory. The controller is configured to obtain print data to perform printing, perform halftone processing for the obtained print data, generate a plurality of pieces of correction information for correcting variations of light amount on a photosensitive body by light radiated from the plurality of light-emitting elements, and correct the print data for which the halftone processing has been performed by using the correction information. The correction information includes various profiles for correcting the variations of light amount.

12 Claims, 23 Drawing Sheets

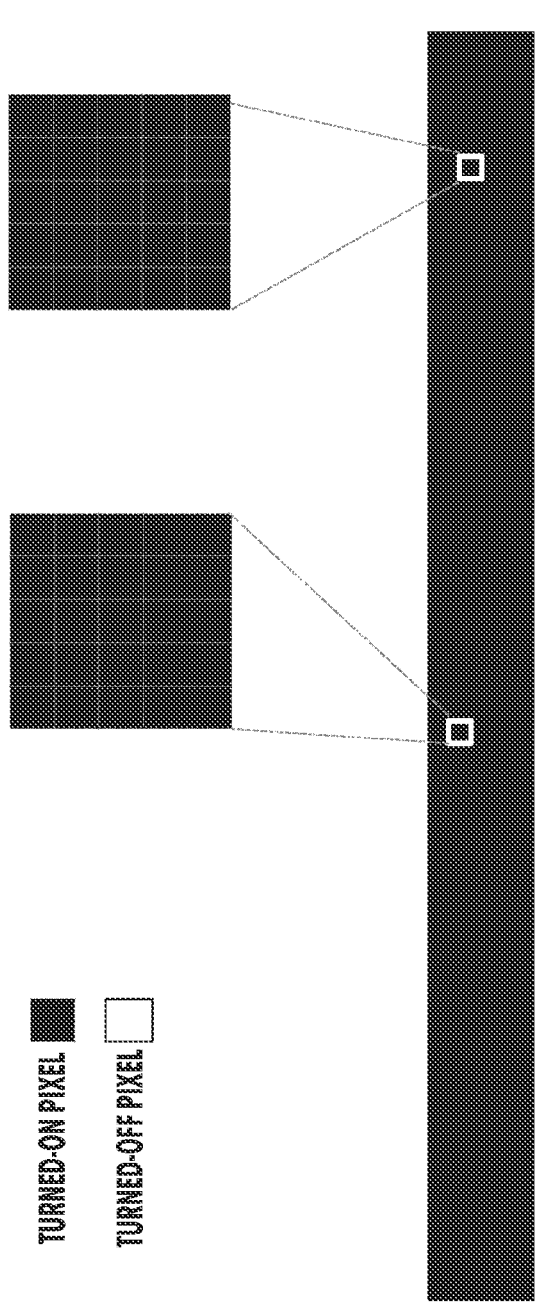
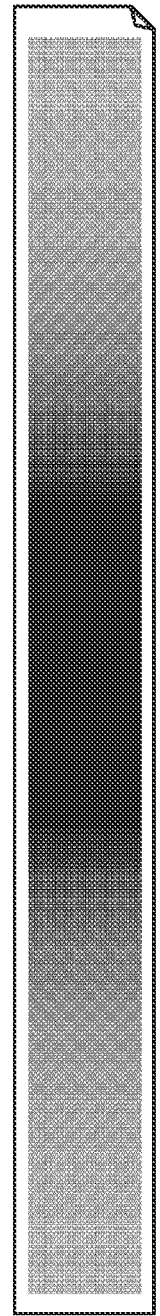
FIG. 8A
FIG. 8B

FIG.12

| chipNo | LIGHT-EMITTING ELEMENT ID | 1 | 2 | 3 | 4 | 5 | 6 | 7 | 8 | 9 | 10 | 11 | 12 | 13 | 14 | 15 | 16 | ... | 512 | - | - | - |
|---|---|---|---|---|---|---|---|---|---|---|---|---|---|---|---|---|---|---|---|---|---|---|
| 1 | FIRST CORRECTION PROFILE | 8 | 8 | 8 | 8 | 8 | 8 | 8 | 8 | 8 | 8 | 8 | 8 | 8 | 8 | 8 | 8 | ... | 8 | 8 | 8 | 8 |
|  | SECOND CORRECTION PROFILE | 5 | 5 | 5 | 5 | 5 | 5 | 5 | 5 | 5 | 5 | 5 | 5 | 5 | 5 | 5 | 5 | ... | 5 | 5 | 5 | 5 |
|  | THIRD CORRECTION PROFILE | | | | 15 | | | | 10 | | | | 10 | | | | 5 | ... | | | | |

| chipNo | LIGHT-EMITTING ELEMENT ID | 1 | 2 | 3 | 4 | 5 | 6 | 7 | 8 | 9 | 10 | 11 | 12 | 13 | 14 | 15 | 16 | ... | 512 | - | - | - |
|---|---|---|---|---|---|---|---|---|---|---|---|---|---|---|---|---|---|---|---|---|---|---|
| 2 | FIRST CORRECTION PROFILE | 16 | 8 | 8 | 15 | 16 | 10 | 10 | 15 | 15 | 8 | 8 | 8 | 15 | 10 | 10 | 16 | ... | 10 | 15 | 8 | 15 |
|  | SECOND CORRECTION PROFILE | 10 | 10 | 10 | 10 | 10 | 10 | 10 | 10 | 10 | 10 | 10 | 10 | 10 | 10 | 10 | 10 | ... | 10 | 10 | 10 | 10 |
|  | THIRD CORRECTION PROFILE | 16 | | | 10 | | | | 6 | | | | 8 | | | | 16 | ... | | | | |

1201 FIRST CORRECTION PROFILE
1202 SECOND CORRECTION PROFILE
1203 THIRD CORRECTION PROFILE

2201

| 16 | 32 | 24 | 40 | 18 | 34 | 26 | 42 |
|---|---|---|---|---|---|---|---|
| 48 | 0 | 56 | 8 | 50 | 2 | 58 | 10 |
| 28 | 44 | 20 | 36 | 30 | 46 | 22 | 38 |
| 60 | 12 | 52 | 4 | 62 | 14 | 54 | 6 |
| 19 | 35 | 27 | 43 | 17 | 33 | 25 | 41 |
| 51 | 3 | 59 | 11 | 49 | 1 | 57 | 9 |
| 31 | 47 | 23 | 39 | 29 | 45 | 21 | 37 |
| 63 | 15 | 55 | 7 | 61 | 13 | 53 | 5 |

MATRIX SIZE : 8x8
SHIFT AMOUNT : 4

FIG.22A

| 16 | 32 | 24 | 40 | 18 | 34 | 26 | 42 | 16 | 32 | 24 | 40 | 18 | 34 | 26 | 42 | 16 | 32 | 24 | 40 |
|---|---|---|---|---|---|---|---|---|---|---|---|---|---|---|---|---|---|---|---|
| 48 | 0 | 56 | 8 | 50 | 2 | 58 | 10 | 48 | 0 | 56 | 8 | 50 | 2 | 58 | 10 | 48 | 0 | 56 | 8 |
| 28 | 44 | 20 | 36 | 30 | 46 | 22 | 38 | 28 | 44 | 20 | 36 | 30 | 46 | 22 | 38 | 28 | 44 | 20 | 36 |
| 60 | 12 | 52 | 4 | 62 | 14 | 54 | 6 | 60 | 12 | 52 | 4 | 62 | 14 | 54 | 6 | 60 | 12 | 52 | 4 |
| 19 | 35 | 27 | 43 | 17 | 33 | 25 | 41 | 19 | 35 | 27 | 43 | 17 | 33 | 25 | 41 | 19 | 35 | 27 | 43 |
| 51 | 3 | 59 | 11 | 49 | 1 | 57 | 9 | 51 | 3 | 59 | 11 | 49 | 1 | 57 | 9 | 51 | 3 | 59 | 11 |
| 31 | 47 | 23 | 39 | 29 | 45 | 21 | 37 | 31 | 47 | 23 | 39 | 29 | 45 | 21 | 37 | 31 | 47 | 23 | 39 |
| 63 | 15 | 55 | 7 | 61 | 13 | 53 | 5 | 63 | 15 | 55 | 7 | 61 | 13 | 53 | 5 | 63 | 15 | 55 | 7 |
| 18 | 34 | 26 | 42 | 16 | 32 | 24 | 40 | 18 | 34 | 26 | 42 | 16 | 32 | 24 | 40 | 18 | 34 | 26 | 42 |
| 50 | 2 | 58 | 10 | 48 | 0 | 56 | 8 | 50 | 2 | 58 | 10 | 48 | 0 | 56 | 8 | 50 | 2 | 58 | 10 |
| 30 | 46 | 22 | 38 | 28 | 44 | 20 | 36 | 30 | 46 | 22 | 38 | 28 | 44 | 20 | 36 | 30 | 46 | 22 | 38 |
| 62 | 14 | 54 | 6 | 60 | 12 | 52 | 4 | 62 | 14 | 54 | 6 | 60 | 12 | 52 | 4 | 62 | 14 | 54 | 6 |
| 17 | 33 | 25 | 41 | 19 | 35 | 27 | 43 | 17 | 33 | 25 | 41 | 19 | 35 | 27 | 43 | 17 | 33 | 25 | 41 |
| 49 | 1 | 57 | 9 | 51 | 3 | 59 | 11 | 49 | 1 | 57 | 9 | 51 | 3 | 59 | 11 | 49 | 1 | 57 | 9 |
| 29 | 45 | 21 | 37 | 31 | 47 | 23 | 39 | 29 | 45 | 21 | 37 | 31 | 47 | 23 | 39 | 29 | 45 | 21 | 37 |
| 61 | 13 | 53 | 5 | 63 | 15 | 55 | 7 | 61 | 13 | 53 | 5 | 63 | 15 | 55 | 7 | 61 | 13 | 53 | 5 |

| 16 | 32 | 24 | 40 | 18 | 34 | 26 | 42 |
|---|---|---|---|---|---|---|---|
| 48 | 0 | 56 | 8 | 50 | 2 | 58 | 10 |
| 28 | 44 | 20 | 36 | 30 | 46 | 22 | 38 |
| 60 | 12 | 52 | 4 | 62 | 14 | 54 | 6 |
| 19 | 35 | 27 | 43 | 17 | 33 | 25 | 41 |
| 51 | 3 | 59 | 11 | 49 | 1 | 57 | 9 |
| 31 | 47 | 23 | 39 | 29 | 45 | 21 | 37 |
| 63 | 15 | 55 | 7 | 61 | 13 | 53 | 5 |

MATRIX SIZE : 8x8
SHIFT AMOUNT : 4

FIG.22C

| 32 | 24 | 40 | 18 | 34 | 26 | 42 | 16 | 32 | 24 | 40 | 18 | 34 | 26 | 42 | 16 | 32 | 24 | 40 | 18 |
|---|---|---|---|---|---|---|---|---|---|---|---|---|---|---|---|---|---|---|---|
| 0 | 56 | 8 | 50 | 2 | 58 | 10 | 48 | 0 | 56 | 8 | 50 | 2 | 58 | 10 | 48 | 0 | 56 | 8 | 50 |
| 44 | 20 | 36 | 30 | 46 | 22 | 38 | 28 | 44 | 20 | 36 | 30 | 46 | 22 | 38 | 28 | 44 | 20 | 36 | 30 |
| 12 | 52 | 4 | 62 | 14 | 54 | 6 | 60 | 12 | 52 | 4 | 62 | 14 | 54 | 6 | 60 | 12 | 52 | 4 | 62 |
| 35 | 27 | 43 | 17 | 33 | 25 | 41 | 19 | 35 | 27 | 43 | 17 | 33 | 25 | 41 | 19 | 35 | 27 | 43 | 17 |
| 3 | 59 | 11 | 49 | 1 | 57 | 9 | 51 | 3 | 59 | 11 | 49 | 1 | 57 | 9 | 51 | 3 | 59 | 11 | 49 |
| 47 | 23 | 39 | 29 | 45 | 21 | 37 | 31 | 47 | 23 | 39 | 29 | 45 | 21 | 37 | 31 | 47 | 23 | 39 | 29 |
| 15 | 55 | 7 | 61 | 13 | 53 | 5 | 63 | 15 | 55 | 7 | 61 | 13 | 53 | 5 | 63 | 15 | 55 | 7 | 61 |
| 34 | 26 | 42 | 16 | 32 | 24 | 40 | 18 | 34 | 26 | 42 | 16 | 32 | 24 | 40 | 18 | 34 | 26 | 42 | 16 |
| 2 | 58 | 10 | 48 | 0 | 56 | 8 | 50 | 2 | 58 | 10 | 48 | 0 | 56 | 8 | 50 | 2 | 58 | 10 | 48 |
| 46 | 22 | 38 | 28 | 44 | 20 | 36 | 30 | 46 | 22 | 38 | 28 | 44 | 20 | 36 | 30 | 46 | 22 | 38 | 28 |
| 14 | 54 | 6 | 60 | 12 | 52 | 4 | 62 | 14 | 54 | 6 | 60 | 12 | 52 | 4 | 62 | 14 | 54 | 6 | 60 |
| 33 | 25 | 41 | 19 | 35 | 27 | 43 | 17 | 33 | 25 | 41 | 19 | 35 | 27 | 43 | 17 | 33 | 25 | 41 | 19 |
| 1 | 57 | 9 | 51 | 3 | 59 | 11 | 49 | 1 | 57 | 9 | 51 | 3 | 59 | 11 | 49 | 1 | 57 | 9 | 51 |
| 45 | 21 | 37 | 31 | 47 | 23 | 39 | 29 | 45 | 21 | 37 | 31 | 47 | 23 | 39 | 29 | 45 | 21 | 37 | 31 |
| 13 | 53 | 5 | 63 | 15 | 55 | 7 | 61 | 13 | 53 | 5 | 63 | 15 | 55 | 7 | 61 | 13 | 53 | 5 | 63 |

FIG.22D

IMAGE FORMING APPARATUS, CONTROL METHOD THEREOF, AND STORAGE MEDIUM FOR CORRECTING VARIATIONS IN LIGHT AMOUNT FROM LIGHT SOURCE

FIELD

The present invention relates to a technique to suppress the occurrence of density unevenness in an electrophotographic image forming apparatus utilizing a line head as a light source.

DESCRIPTION OF THE RELATED ART

In an electrophotographic image forming apparatus utilizing a line head in which a plurality of light-emitting elements is arranged side by side as an exposure unit, there is a case where the light amount is not uniform for each main scanning position on a photosensitive body. In a case where the light amount is not uniform as described above, there is a possibility that density unevenness in the main scanning direction occurs in an image formed on a printing medium. In order to suppress the occurrence of the density unevenness, for example, a circuit that corrects the light amount on the photosensitive body is provided for each main scanning position and image data that is used by the exposure unit is corrected by this correction circuit. Specifically, at the time of forming an image on a printing medium, based on a correction profile held in advance in a memory and indicating the difference in the light amount corresponding to each light-emitting element, the image data is corrected so that the light-emitting element corresponding to the area in which the reproduction density is high is turned off.

In this regard, Japanese Patent Laid-Open No. 2018-151566 has disclosed a technique to perform correction processing to correct variations in the light amount resulting from other than the light-emitting element for image data before halftone processing is performed therefor.

SUMMARY

In Japanese Patent Laid-Open No. 2018-151566, the size of the portion for which the correction has been performed is affected by the halftone processing, and therefore, in the image data for which the halftone processing has been performed, the above-described correction is not reflected appropriately.

The image forming apparatus according to one aspect of the present invention is an electrophotographic image forming apparatus that utilizes a line head in which a plurality of light-emitting elements is arranged as a light source and includes: an obtaining unit configured to obtain image data that is obtained by performing halftone processing for printing-target image data; a generation unit configured to generate a plurality of pieces of correction information corresponding to types of cause of variations of light amount for correcting the variations of light amount on a photosensitive body by light radiated from the plurality of light-emitting elements; and a correction unit configured to correct the image data for which halftone processing has been performed by using the correction information, wherein the correction unit does not correct the printing-target image data.

Further features of the present invention will become apparent from the following description of exemplary embodiments with reference to the attached drawings.

BRIEF DESCRIPTION OF THE DRAWINGS

FIG. 8A and FIG. 8B are diagrams showing an HT image example for which light amount correction has not been performed and an example of printed material thereof;

FIG. 12 is a diagram showing correction profile examples;

FIG. 22A to FIG. 22D are diagrams for explaining a correspondence relationship between matrix data, HT image data, and threshold values.

DESCRIPTION OF THE EMBODIMENTS

In the following, aspects for embodying the present invention are explained with reference to the drawings. The following embodiments are not intended to limit the present invention related to the claims and all combinations of features explained in the present embodiments are not necessarily indispensable to the solution of the present invention. The same configuration is explained by attaching the same symbol.

First Embodiment

Figure 1:
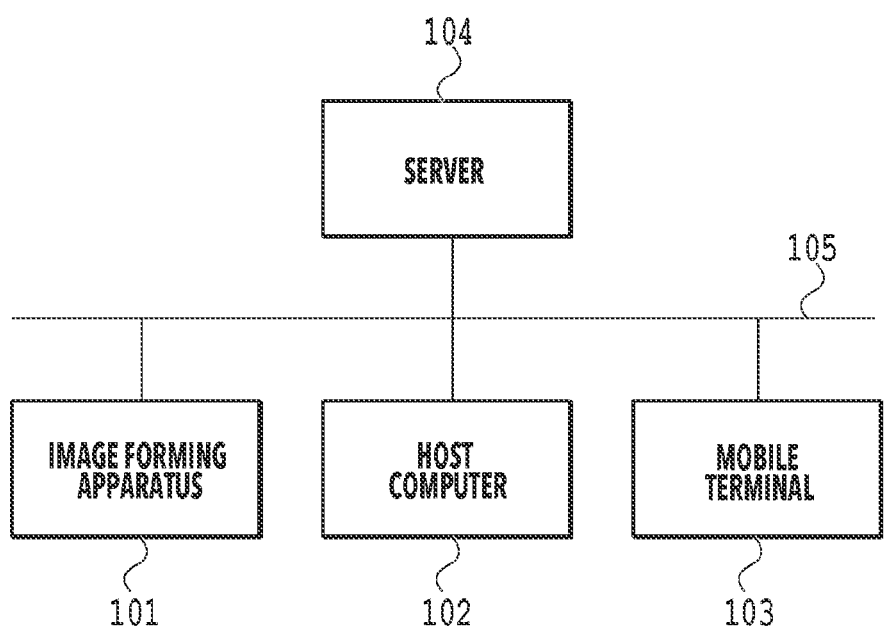
FIG. 1 is a diagram explaining a configuration of a system.

FIG. 1 a diagram explaining the configuration of a system including an image forming apparatus 101 according to the present embodiment. The present system has the image forming apparatus 101, a host computer 102, a mobile terminal 103, and a server 104. These devices are connected with a network 105 so as to be capable of transmitting and receiving data to and from one another. The image forming apparatus 101 forms (prints) an image by an electrophotographic method. The image forming apparatus 101 receives image data from the host computer 102, the mobile terminal 103, the server 104, or another image processing apparatus, not shown schematically, via the network 105 and performs printing (image formation). Further, it is possible for the image forming apparatus 101 to transmit image data obtained by reading a document with an image reading unit 202 belonging to the image forming apparatus 101 itself to the host computer 102, the mobile terminal 103, or the server 104 via the network 105. Furthermore, it is possible for the image forming apparatus 101 to perform the copy operation by printing the image data obtained by the reading by utilizing a printing unit 206 belonging to the image forming apparatus 101 itself.

In the present embodiment, an example is explained in which the image forming apparatus 101 is an image processing apparatus that performs halftone processing for printing-target image data, but the example is not limited to this. The image processing, such as halftone processing, may be performed by the host computer 102 or the like, which is the source of the transmission of the printing-target image data. Further, it may also be possible for the image forming apparatus 101 and the host computer 102, which is the source of the transmission of the image data, the mobile terminal 103, the server 104 or the like to distribute processing, to be explained later, in cooperation with each other.

<Configuration of Image Forming Apparatus>

Figure 2:
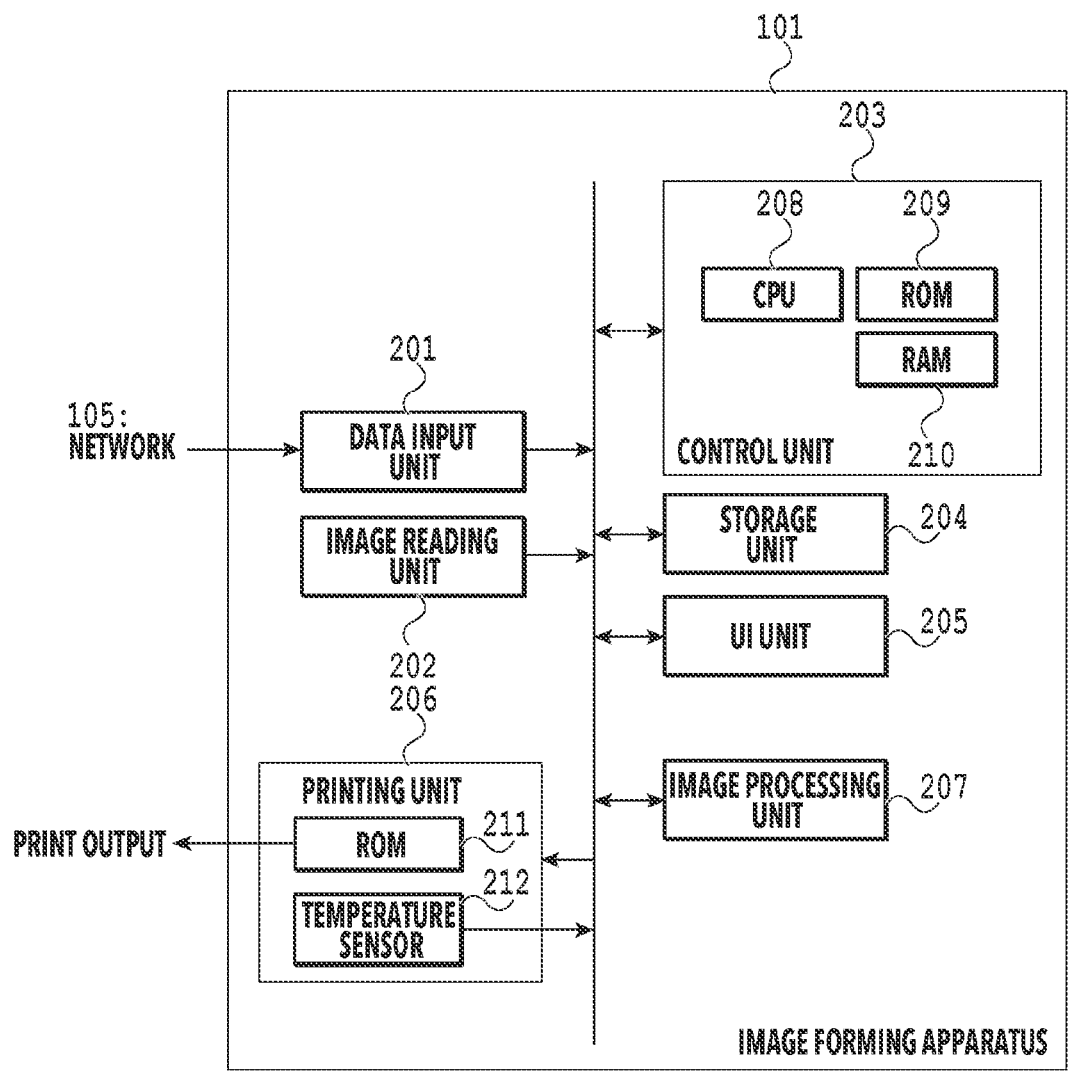
FIG. 2 is a block diagram explaining a configuration of an image forming apparatus.

FIG. 2 is a function block diagram explaining the configuration of the image forming apparatus 101. The image forming apparatus 101 has a data input unit (receiving unit) 201, the image reading unit 202, a control unit 203, a storage unit 204, a UI (User Interface) unit 205, the printing unit 206, and an image processing unit 207.

The data input unit 201 receives print data transmitted from, for example, the server 104, via the network 105 and inputs the print data. The image reading unit 202 has a scanner and obtains image data of a document by reading the image of the document. The control unit 203 is configured to control the operation of the image forming apparatus 101 and has a CPU 208, a ROM 209, and a RAM 210. The CPU 208 performs processing, to be described later, by executing programs stored in the ROM 209. The storage unit 204 is, for example, a storage device that stores large-capacity data, for example, such as a hard disk drive (HDD). The CPU 208 may be configured to load a program stored in the storage unit 204 onto the RAM 210 and perform processing, to be described later. The UI unit 205 includes an operation panel and a display unit and displays a message to a user, receives operation instructions by a user, and so on. The UI unit 205 may comprise a touch panel function.

The printing unit 206 is a printer engine and in the present embodiment, forms an image in which toner images of a plurality of colors (for example, Cyan/Magenta/Yellow/Black; in the following, referred to as C/M/Y/K) are overlapped on a printing medium by the electrophotographic method and the tandem method. The configuration of color materials is not limited to this. An image forming apparatus using only black may be accepted or an image forming apparatus having a color other than the four colors described above may be accepted. In the present embodiment, explanation is given with the configuration in which the printing unit 206 has a printing resolution of 2,400 dpi in the main scanning direction and in the sub scanning direction. The above-described printing resolution is one example and the printing resolution is not limited to this.

Further, the printing unit 206 has a ROM 211 for each line head of each color used for exposure control of a photosensitive body. The ROM 211 holds information on manufacturing variations of each individual line head, such as information on the attachment position and inclination of LED chips, which are measured by a jig in the production process, such as the line head manufacturing process. Further, the ROM 211 holds a correction profile putting together correction values for correcting variations of light amount. Details of the correction profile will be described later.

The image processing unit 207 performs various kinds of image processing for the image data included in the input print data. The image processing unit 207 may be a processing unit, such as hardware specialized in each of the various kinds of image processing, or may have a configuration in which the function is implemented by the CPU 208 executing the above-described program.

<Configuration of printing unit>

Figure 3:
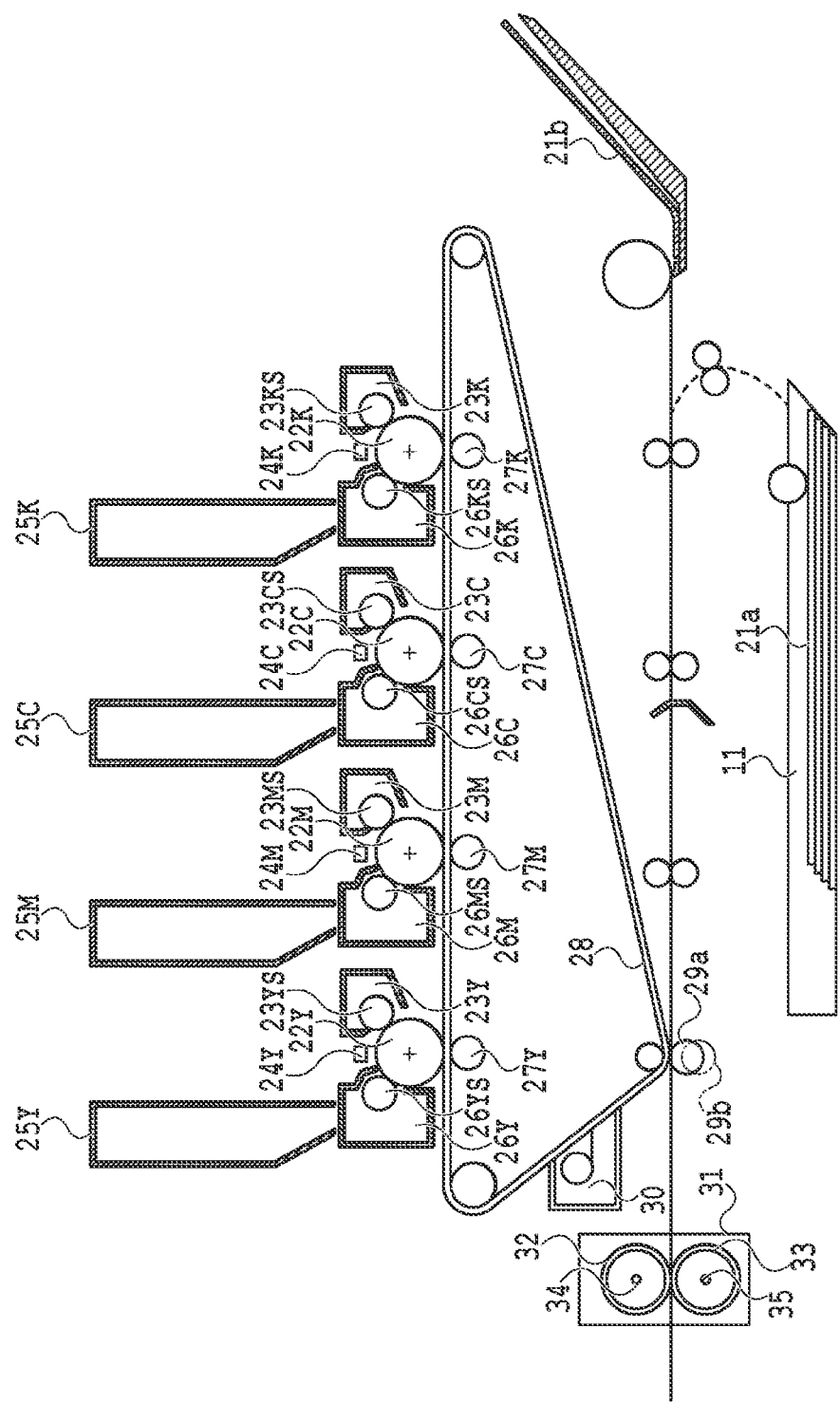
FIG. 3 is a cross-sectional diagram of a printing unit of the image forming apparatus.

FIG. 3 is a cross-sectional diagram of the printing unit 206 in the tandem-type electrophotographic image forming apparatus 101 employing an intermediate transfer body 28. By using FIG. 3, the operation of the printing unit 206 is explained. In FIG. 3, the member provided for each color is indicated by appending a letter (C/M/Y/K) indicating each color to the end of the symbol, but in a case where explanation is given without distinguishing between colors in particular, the letter at the end of the symbol is omitted in explanation.

First, an outline is explained. The printing unit 206 exposes a photosensitive body 22 in accordance with image data processed by the image processing unit 207 to form an electrostatic latent image and forms a single-color toner mage by developing the electrostatic latent image. Then, the printing unit 206 forms a multicolored toner image by overlapping the single-color toner image of each color on the intermediate transfer body 28. The printing unit 206 transfers the multicolored toner image onto a printing medium 11 and fixes the multicolored toner image on the printing medium by a fixing device 31.

Next, details of the configuration of the printing unit 206 are explained by using FIG. 3. An injection charger 23 is for uniformly charging the surface of the photosensitive body 22 to a potential determined in advance and has a sleeve 23S.

The photosensitive body 22 rotates by a drive force of a drive motor, not shown schematically, being transmitted. The drive motor rotates the photosensitive body 22 in the counterclockwise direction in FIG. 3 in accordance with the image forming operation. The exposure unit is configured to form an electrostatic latent image by irradiating the photosensitive body 22 with exposure light by an LED from an LED line head 24 arranged in parallel with the photosensitive body 22 and selectively exposing the surface of the photosensitive body 22. That is, the LED line head 24 is utilized as a light source of the exposure unit in the electrophotographic image forming apparatus.

A developer 26 is for visualizing the electrostatic latent image on the photosensitive body 22 with single-color toner and has a sleeve 26S. The developer 26 is configured so as to be capable of being attached to and detached from the photosensitive body 22.

The intermediate transfer body 28 rotates in the clockwise direction in FIG. 3 in order to receive the single-color toner image from the photosensitive body 22. Accompanying the rotation of the photosensitive body 22 and a primary transfer roller 27 located at a position facing the photosensitive body 22, the single-color toner image is transferred onto the intermediate transfer body 28. By making the rotation speed of the photosensitive body 22 differ from the rotation speed of the intermediate transfer body 28 as well as applying an appropriate bias voltage to the primary transfer roller 27, the single-color toner image is transferred onto the intermediate transfer body 28 efficiently. This is referred to as primary transfer.

Further, the single-color toner image of each station of CMYK is overlapped on the intermediate transfer body 28. The overlapped multicolored toner image is conveyed up to a secondary transfer roller 29 accompanying the rotation of the intermediate transfer body 28. Further, the printing medium 11 is conveyed in a state of being nipped from a feeding tray 21a or 21b to the secondary transfer roller 29 and the multicolored toner image on the intermediate transfer body 28 is transferred onto the printing medium 11. At this time, by applying an appropriate bias voltage to the secondary transfer roller 29, the toner image is transferred electrostatically. This is referred to as secondary transfer. The secondary transfer roller 29 is in contact with the printing medium 11 at a position 29a while transferring the multicolored toner image onto the printing medium 11 and after the printing processing, the secondary transfer roller 29 separates from the printing medium 11 to a position 29b.

The fixing device 31 has a fixing roller 32 that heats the printing medium 11 and a press roller 33 for pressure-contacting the printing medium 11 to the fixing roller 32 in order to fuse-fix the multicolored toner image transferred onto the printing medium 11 to the printing medium 11. The fixing roller 32 and the press roller 33 are formed into the hollow shape and heaters 34 and 35 are incorporated inside thereof, respectively. The fixing device 31 applies heat and pressure to fix toner onto the printing medium 11 as well as conveys the printing medium holding the multicolored toner image with the fixing roller 32 and the press roller 33.

The printing medium 11 to which toner has been fixed is discharged onto a discharge tray, not shown schematically, by a discharge roller, not shown schematically, and the image forming operation is completed. A cleaning unit 30 cleans toner that is left on the intermediate transfer body 28 and the waste toner that is left after the multicolored toner image of four colors formed on the intermediate transfer body 28 is transferred onto the printing medium 11 is stored in a cleaner vessel.

<Configuration of LED line head>

Figure 4:
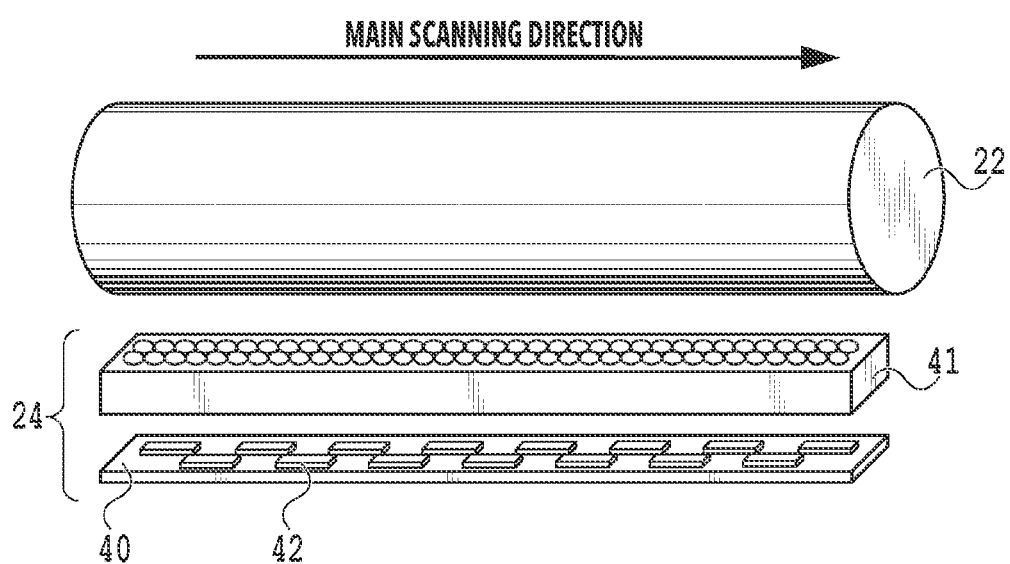
FIG. 4 is a diagram showing a configuration example of an LED line head.

FIG. 4 is a diagram showing a configuration example of the LED line head 24 arranged in parallel with the photosensitive body 22. In the present embodiment, the LED line head 24 includes a print substrate 40 on which a circuit for supplying various signals to control the drive of the LED line head 24 is formed, and a lens array 41. Further, on the print substrate 40, a plurality of LED chips 24 is arranged in a staggered pattern. The size of the LED line head 24 may be, for example, about the size of the photosensitive body 22 in the main scanning direction or may be smaller than that of the photosensitive body 22.

Figure 5:
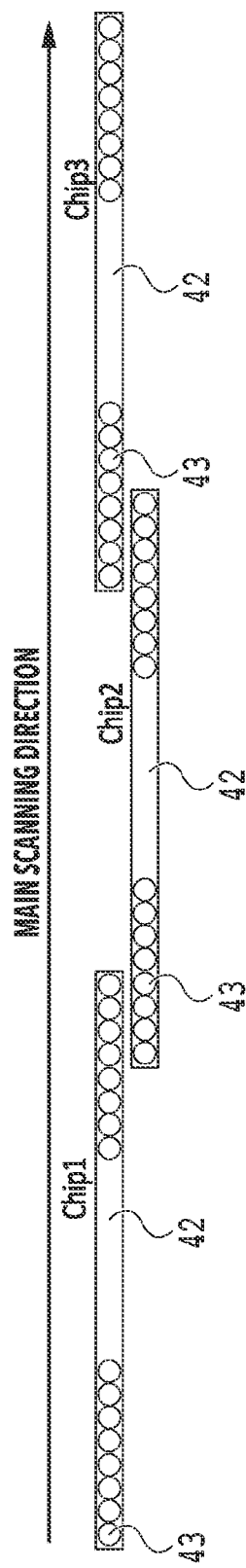
FIG. 5 is a diagram showing an arrangement example of LED chips.

A configuration example of the LED chip 42 is explained by using the drawing. FIG. 5 is a diagram schematically showing a configuration example of the LED chip 42. As shown in FIG. 5, in the LED chip 42, 512 LED light-emitting elements 43 are arranged at equal intervals. As the LED light-emitting element, for example, it is possible to use an LED (Light Emitting Diode) and an organic LED (Organic Light Emitting Diode). The arrangement of the LED light-emitting elements 43 is such that at the end portion within the LED chip 42, the main scanning position overlaps that of the LED light-emitting elements 43 included in the different LED chip 42. In FIG. 5, the LED light-emitting elements 43 are arranged in the state where the four light-emitting elements overlap between different chips. The arrangement of the LED chips 42 and the number of light-emitting elements are not limited to those. For example, the LED light-emitting elements 43 may be arranged two-dimensionally in the main scanning direction and in the sub scanning direction. In the following, in addition to the explanation of the configuration of the LED line head 24, the causes of the variations of light amount on the photosensitive body are explained, which are corrected in the present embodiment.

Figure 6:
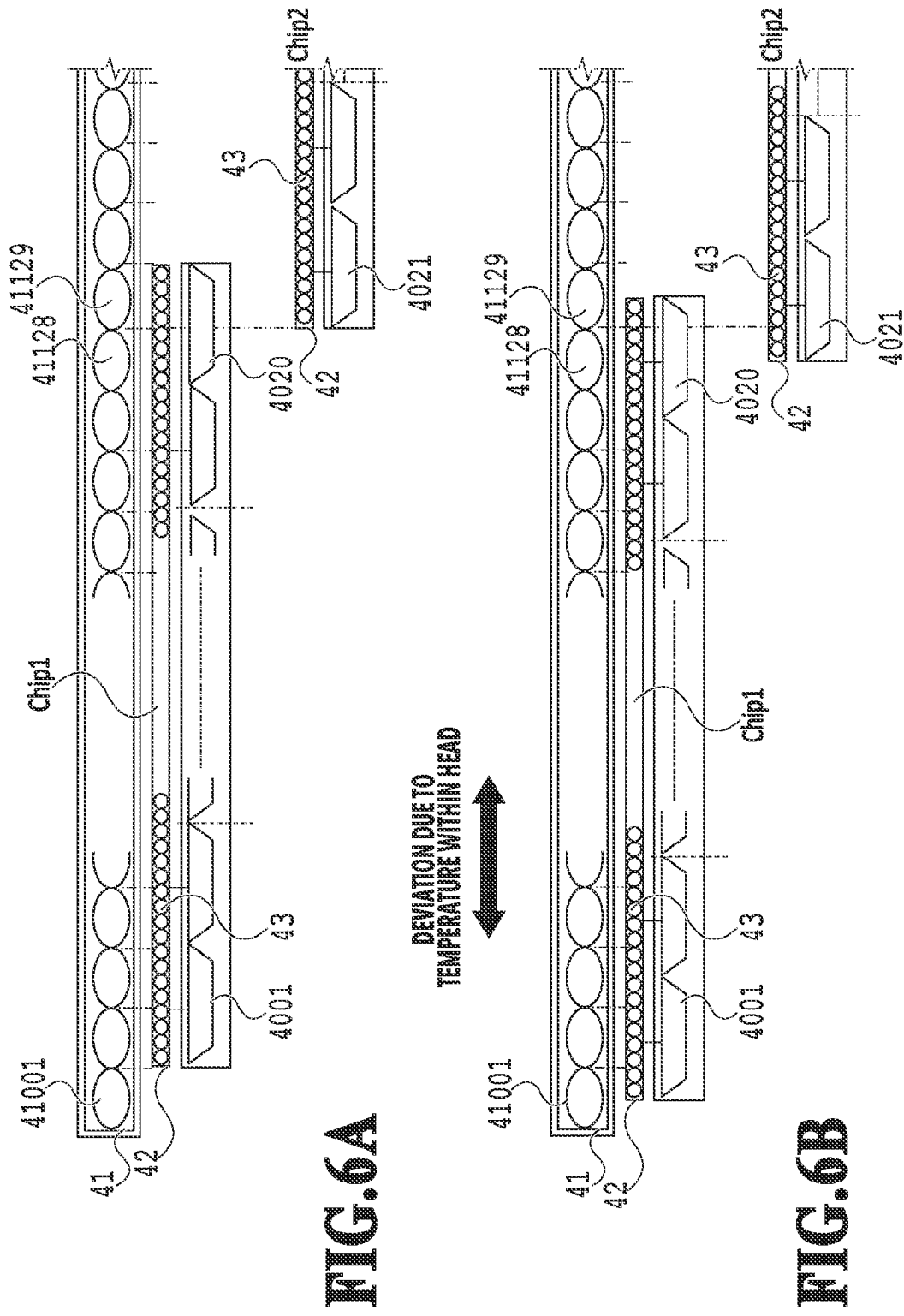
FIG. 6A and FIG. 6B are each a diagram showing a correspondence relationship between an LED light-emitting element and a rod lens.

First, the correspondence relationship between the LED light-emitting element 43 within the LED chip 42 and a rod lens/current source, to be described later, is explained by using the drawings. FIG. 6A and FIG. 6B are each a diagram showing the correspondence relationship between the LED light-emitting element 43 within the LED chip 42 and the rod lens/current source, to be described later. FIG. 6A shows a case where there is not a change in temperature within the LED line head and FIG. 6B shows a case where there is a change in temperature within the LED line head. The variations of light amount on the photosensitive body, which occur resulting from the LED line head 24, are explained.

<Causes Resulting from LED Line Head 24>

The lens array 41 is a device that is provided between the LED chip 42 and the photosensitive body 22 and functions as an image forming lens. The lens array 41 is configured by a refractive index distribution-type rod lens being arrayed at a pitch in which, for example, one rod lens corresponds to the four LED light-emitting elements 43, as shown in FIG. 6A and causes the light emitted from each LED light-emitting element 43 to form an image on the photosensitive body 22. In the rod lens, there is a difference in transmittance between the center and the end, and therefore, the light amount on the photosensitive body 22 varies. The present embodiment has correction values that correct the variations of light amount depending on the lens position as a first correction profile 901. That is, it can be said that the first correction profile 901 is correction information for correcting the variations of light amount on the photosensitive body depending on the lens position. Further, the print substrate 40 expands and contracts depending on the temperature within the LED line head 24. By the print substrate 40 expanding and contracting, the position of the LED light-emitting element 43 belonging thereto also varies. However, the position of the lens array 41 does not vary. As a result of that, the correspondence relationship between the LED light-emitting element 43 and the rod lens changes to the relationship as in FIG. 6A and FIG. 6B, that is, the LED light-emitting element 43 moves in parallel while maintaining the distance between the rod lens and the LED light-emitting element 43. In view of the deviation in the correspondence relationship, the lens array 41 is prepared in the state where the width of the lens array 41 is greater than that of the LED chip 42. In FIG. 6A, the LED line head 24 further has a rod lens 41001 on the left end, which is arranged outside the LED chip 42. Further, the image forming apparatus 101 has a temperature sensor 212 that detects the temperature within the LED line head 24 and updates the position that is referred to from the first correction profile 901 by taking the detected temperature changing by a predetermined temperature or more as a trigger. The first correction profile 901 holds the correction profiles corresponding to all the rod lenses in the ROM 211 of the LED line head 24. The image forming apparatus 101 adjusts the correspondence relationship with the LED light-emitting element 43 in accordance with the change in temperature within the LED line head 24, holds the results of updating the position to be referred to in the RAM 210 of the control unit 203, and uses the results for the generation of the correction signal. The aspect of the correction profile and details of the generation method of the correction signal will be described later.

On the print substrate 40, the ROM 211 in which information on the manufacturing variations of the LED line head 24, which are measured in the manufacturing processing, and the like is stored and the current source that supplies a current to the LED light-emitting element 43 are arranged on the backside of the substrate and the like. Like the rod lens, a plurality of current sources exists and a plurality of the LED light-emitting elements 43 corresponds to one current source. The correspondence relationship between the current source and the LED light-emitting element 43 is shown in FIG. 6A. As shown in FIG. 6A, the configuration is, for example, such that the LED light-emitting elements and the current source are arrayed at a pitch of the eight LED light-emitting elements and the one current source corresponding to each other. In the LED chip 42 of Chip 1, a current source 4001 located on the left end corresponds to the eight LED light-emitting elements 43 on the left end and a current source 4020 located on the right end corresponds to the eight LED light-emitting elements 43 on the right end. In the LED chip 42 of Chip 1, the four LED light-emitting elements 43 on the right end correspond to a rod lens 41129 and the four LED light-emitting elements 43 to the immediate left of the four LED light-emitting elements 43 on the right end correspond to a rod lens 41128 to the immediate left of the rod lens 41129. Further, the four LED light-emitting elements 43 on the left end in the LED chip 42 of Chip 2 are arranged so as to overlap the four LED light-emitting elements 43 on the right end in the LED chip 42 of Chip 1 in the main scanning direction. In the LED chip 42 of Chip 2, a current source 4021 located on the left end corresponds to the eight LED light-emitting elements 43 on the left end. However, due to the individual difference of the above-described current source, the emitted light amount of the LED light-emitting element 43 varies and as a result of that, the light amount on the photosensitive body 22 varies. The correction value for suppressing the variations of light amount is possessed as a second correction profile 902. It can be said that the second correction profile 902 is correction information for correcting the variations of light amount on the photosensitive body 22, which are caused by the individual difference of the current source. Unlike the above-described correspondence relationship between the rod lens and the LED light-emitting element 43, the correspondence relationship between the LED light-emitting element 43 and the current source does not change over time. Because of this, at the time of assembling the LED line head 24, the difference in the emitted light amount between the current sources is measured and the second correction profile 902 created based on the measurement results is held in advance in the ROM 211 of each line head, and the second correction profile 902 is used for the generation of a correction signal. The aspect of the correction profile and details of the generation method of a correction signal will be described later.

<Causes Resulting from Other than LED Line Head 24>

The first and second correction profiles 901, 902 are the variations of the emitted light amount of the LED light-emitting element 43, which result from the LED line head 24. Next, the variations of light amount on the photosensitive body 22 are explained, which result from the positional relationship between the LED line head 24 and the photosensitive body 22. For example, mention is made of the eccentricity of the photosensitive body 22. In a case where the rotation axis is inclined with respect to the axis line of the photosensitive body 22, the distance from the LED line head 24 to the photosensitive body 22 changes at the main scanning position and the variations of light amount occur on the photosensitive body. The cycle of the variations of light amount on the photosensitive body is low compared to those at the lens position and the current source. The present embodiment has the correction value that corrects the variations of light amount due to the positional relationship between the LED line head 24 and the photosensitive body 22 as a third correction profile 903. It can be said that the third correction profile 903 is correction information for correcting the variations of light amount on the photosensitive body due to the positional relationship between the LED line head 24 and the photosensitive body 22. For example, the correction value is possessed for each 16 light-emitting elements. Further, the positional relationship between the LED line head 24 and the photosensitive body 22 changes over time due to the exchange of the parts including the photosensitive body 22 or depending on the number of printed sheets after the exchange. Because of this, updating of the third correction profile 903 is performed triggered by calibration instructions at the time of exchange of parts or instructions from a user who has recognized that the density unevenness in the main scanning direction is conspicuous. The third correction profile 903 is held in the storage unit 204. The aspect of the correction profile and details of the generation method of a correction signal will be described later.

As above, in the LED line head 24, the many LED light-emitting elements 43 arranged side by side in the main scanning direction are caused to correspond to another part within the LED line head 24 in different units. Because of this, the variations of light amount in which a plurality of different cycles exists in a mixed manner occur. Further, other than the variations of light amount resulting from the LED line head 24, the variations of light amount occur on the photosensitive body 22 resulting from the positional relationship between the LED line head 24 and the photosensitive body 22.

On the other hand, the presence/absence of updating of the correction profile and the trigger of updating are different from cause to cause that causes the variations of light amount to occur on the photosensitive body. Because of this, in a case where one correction profile that integrates the variations of light amount on the photosensitive body due to a plurality of causes is held, at the timing of updating any one of the correction profiles, all the data needs to be updated, and therefore, the updating processing cost is raised. Consequently, in the present embodiment, in order to make it possible to update only the correction profile that needs to be updated at the updating timing, the correction profile is held for each cause. That is, in order to make it possible to update the correction profile at different timing for each of a plurality of kinds of correction profile (for each of a plurality of kinds of correction information), a plurality of kinds of correction profile is held.

<Configuration of Image Processing Unit>

Next, the configuration of the image processing unit 207 is explained, which performs image processing for image data included in input print data at the time of the image forming apparatus 101 according to the present embodiment forming (printing) an image by utilizing the printing unit

Figure 7:
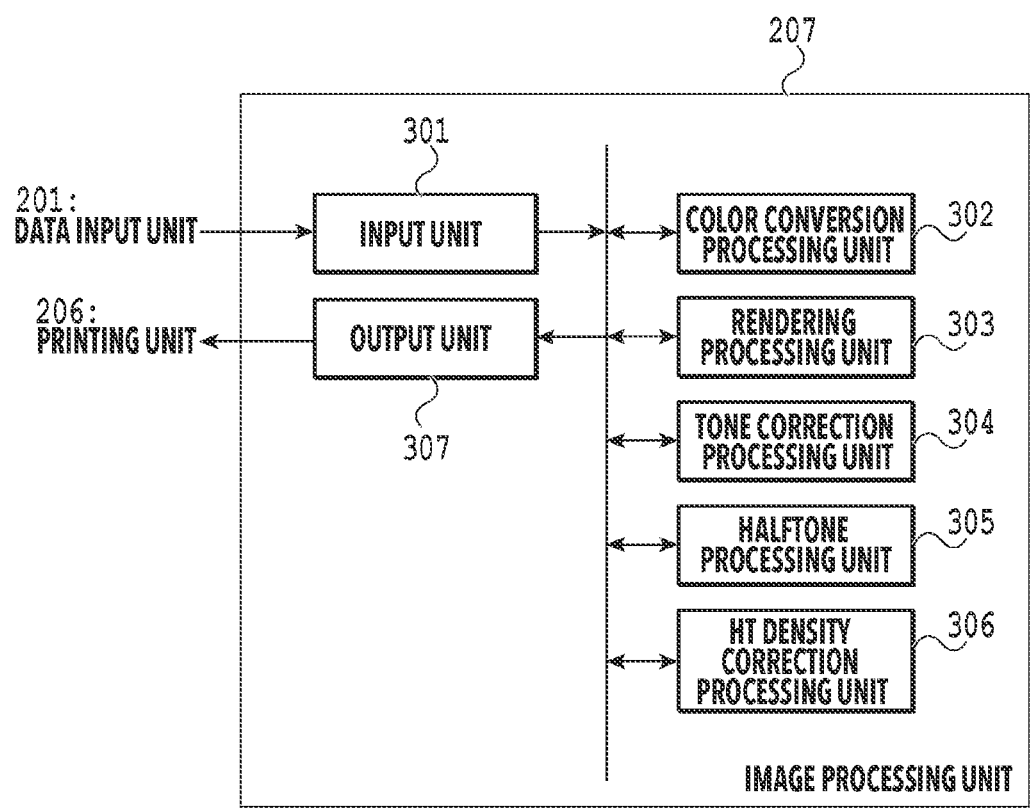
FIG. 7 is a function block diagram explaining a configuration of an image processing unit.

206. FIG. 7 is a function block diagram explaining the configuration of the image processing unit 207. As described previously, the function of the image processing unit 207 may be implemented by hardware or may be implemented by the CPU 208 executing a program.

The image processing unit 207 includes an input unit 301, a color conversion processing unit 302, a rendering processing unit 303, a tone correction processing unit 304, a halftone processing unit 305, an output unit 307, and an HT density correction processing unit 306. HT attached to the top of the HT density correction processing unit 306 is an abbreviation of halftone and indicates that the HT density correction processing unit 306 receives and processes the image data for which halftone processing has been performed.

The input unit 301 receives, for example, image data described in PDL (Page Description Language), which is included in the print data received by the data input unit 201. The color conversion processing unit 302 color-converts, for example, image data in the RGB color space into image data in the CMYK color space. The rendering processing unit 303 converts the received PDL data into image data by performing rendering. It is possible for the rendering processing unit 303 to switch rendering processing in accordance with fine and superfine instructions. In the fine instructions, image data is generated with a resolution of 600 dpi in the main scanning direction and in the sub scanning direction. In the superfine instructions, image data is generated with a resolution of 1,200 dpi in the main scanning direction and in the sub scanning direction. It is possible for a user to give instructions to perform these settings of resolution via the UI unit 205 and the setting of resolution is selected by instructions for resolution included in the print data received by the data input unit 201.

The tone correction processing unit 304 performs tone correction for the printer density characteristic in accordance with a dither matrix of the halftone processing that is applied to the halftone of the image data so that the image data of each color plane of CMYK has the targeted output density. The printer density characteristic described here is obtained by measuring the printed material shown below. That is, the printer density characteristic is obtained by printing a halftone dot patch obtained by performing halftone processing for the signal value of each color plane in the state where the density unevenness and streak due to the variations of light amount of the LED line head 24 are corrected by the HT density correction processing unit 306 and measuring the printed material.

The halftone processing unit 305 performs halftone processing for the image data of each color plane of CMYK, for which the tone correction has been performed, and converts the halftone of the image data into an N-valued halftone dot image (halftone image data) represented in area gradation. In the following, the halftone image data for which halftone processing has been performed is called HT image data by using HT, which is an abbreviation. In the present embodiment, resolution conversion into a printing resolution of 2,400 is performed at the same time. That is, in order to perform halftone processing in accordance with a printing resolution of 2,400 dpi for the input image data whose resolution is 600 dpi, the halftone processing is performed by quadrupling the input image data whose resolution is 600 dpi in the main scanning direction and in the sub scanning direction while repeating reference. The characteristic of the present embodiment does not necessarily require that the printing resolution be achieved in the stage of halftone processing but only requires that the printing resolution be achieved by the HT density correction processing unit 306, to be described later. For example, it may also be possible to provide a processing unit having a resolution conversion function to convert the resolution into the printing resolution after the halftone processing unit 305.

The HT density correction processing unit 306 obtains the first and second correction profiles from the ROM 211 of the line head of each color plane within the printing unit 206 and the third correction profile from the storage unit 204 and generate a correction signal for each main scanning position based on these correction profiles. The HT density correction processing unit 306 performs density correction based on the correction signal of each main scanning position for the image data for which the halftone processing has been performed.

<Light Amount Correction Method by Adjustment of HT Image Data>

A method of adjusting variations of light amount by correcting HT image data is explained by using the drawings. FIG. 8A and FIG. 8B are diagrams for explaining an HT image data example for which light amount correction has not been performed and a printed material thereof and FIG. 8A shows a turned-on pixel and a turned-off pixel in the HT image data and FIG. 8B shows the printed material of the HT image data in FIG. 8A. For example, as shown in FIG. 8A, even in a case where an attempt is made to generate a printed material whose density is even based on the HT image data in which all the LED light-emitting elements 43 are caused to emit light, on a condition that the light amount on the photosensitive body 22 varies, the results will be as follows. That is, due to the variations of light amount of each main scanning position of the photosensitive body, as shown in FIG. 8B, the printed material is such that the density varies for each main scanning position. Consequently, the LED light-emitting elements 43 corresponding to the area in which the emitted light amount is large relatively compared to that in other areas are turned off stochastically.

Figure 9A:
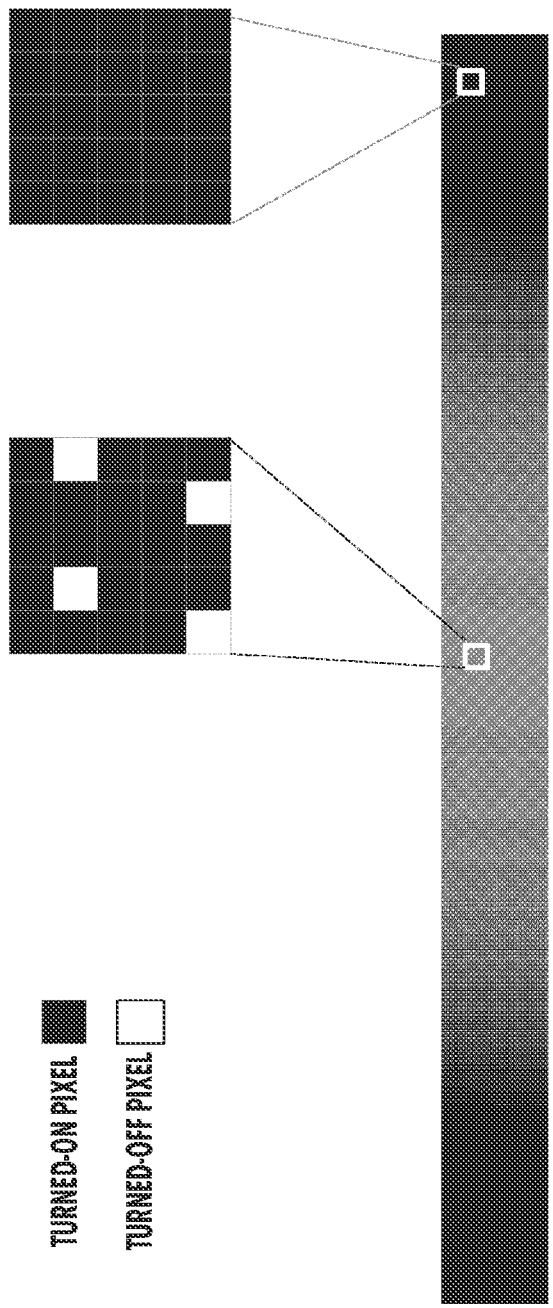
FIG. 9A and FIG. 9B are diagrams showing an HT image example for which light amount correction has been performed and an example of printed material thereof.
Figure 9B:
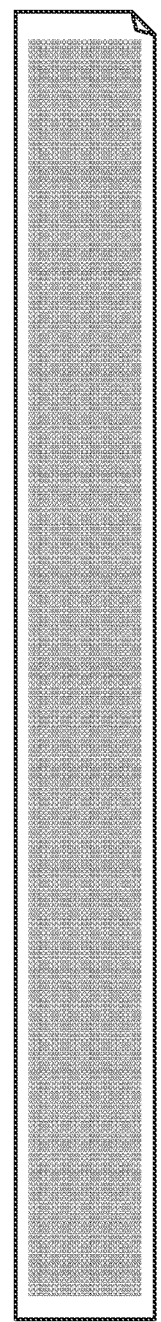

FIG. 9A and FIG. 9B are diagrams for explaining a processed HT image data example for which light amount correction has been performed and a printed material thereof and FIG. 9A shows a turned-on pixel and a turned-off pixel in the HT image data and FIG. 9B shows the printed material by the HT image data in FIG. 9A. As shown in FIG. 9A, control is performed so that the difference in the emitted light amount becomes small in terms of the unit area consisting of a plurality of pixels by stochastically turning off the pixels of the HT image corresponding to the center area in the main scanning direction, which is the area in which the emitted light amount is relatively large. As a result of that, although still uneven in the stage of the HT image data, by the variations of light amount on the photosensitive body being added, as shown in FIG. 9B, the difference in the density that is reproduced as the printed material becomes small. In the present embodiment, the above-described probability with which the pixel is turned off is determined in accordance with the correction profile and thereby, the variations of light amount of each main scanning position are made small. Details of the HT density correction processing unit 306 will be described later, which is the characteristic of the present embodiment.

The output unit 307 delivers the density correction signal data generated by the HT density correction processing unit 306 to the printing unit 206.

<Processing Flow of Image Processing Unit 207>

Figure 10:
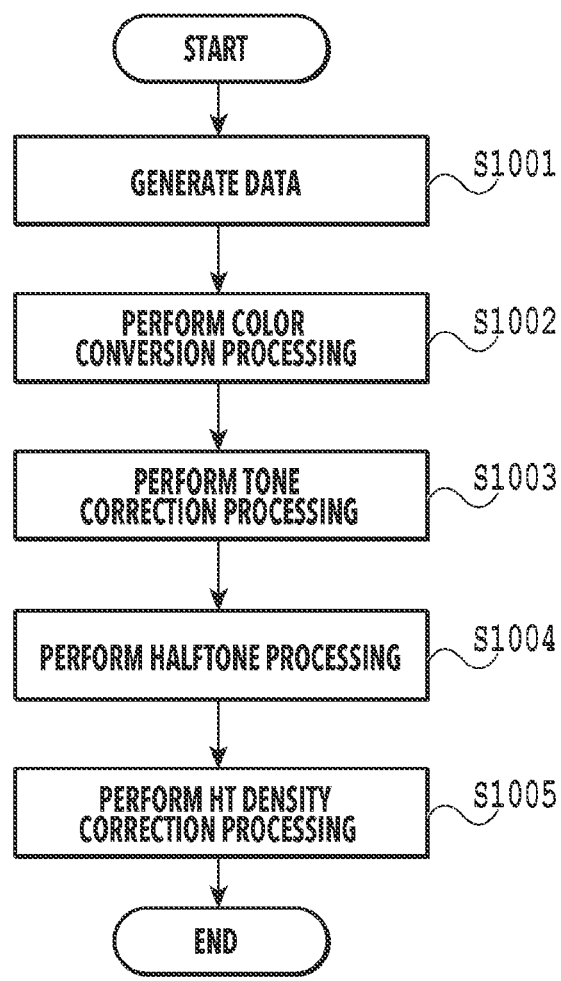
FIG. 10 is a flowchart showing a flow of processing by an image processing unit.

The processing flow by each processing unit constituting the image processing unit 207 is explained by using the drawing. FIG. 10 is a flowchart showing a flow of image processing by the image processing unit 207. The processing shown in FIG. 10 is achieved by the CPU 208 reading a program stored in the ROM 209, loading the program onto the RAM 210, and executing the program.

At S1001, the CPU 208 delivers document data received by the data input unit 201 to the rendering processing unit 303 via the input unit 301 of the image processing unit 207. Then, by the rendering processing unit 303, the input document data is converted into raster image data of RGB with a resolution of 600 dpi in the main scanning direction and in the sub scanning direction and the image data is supplied to the color conversion processing unit 302.

At S1002, the CPU 208 performs processing to color-convert the generated RGB data into CMYK data by controlling the color conversion processing unit 302. The image data for which the color conversion processing has been performed is delivered to the tone correction processing unit 304.

At S1003, by controlling the tone correction processing unit 304, the CPU 208 performs tone correction processing for the image data of each color plane in view of the tone characteristic of the printing unit 206 of the image forming apparatus 101 for the dither matrix of the halftone processing that is applied to the halftone of the image data. The image data for which the tone correction processing has been performed is delivered to the halftone processing unit 305. A plurality of kinds of dither matrix to be applied to the halftone is possessed and it is possible for a user to designate the kind of dither matrix in the UI unit 205. The tone characteristic of the printing unit 206 varies depending on the dither matrix of the halftone processing, and therefore, it is necessary to switch the tone correction processing in accordance with the dither matrix. Consequently, in accordance with the kind of dither matrix designated in the UI unit 205, the tone correction processing is performed.

At S1004, by controlling the halftone processing unit 305, the CPU 208 generates HT image data, which is 1-bit data indicating ON or OFF of light emission of the LED light-emitting element 43, while performing resolution conversion for the CMYK data for which the tone correction has been performed. In the resolution conversion, conversion from a printing resolution of 600 dpi to a printing resolution of 2,400 dpi is performed. The generated HT image data is sent to the HT density correction processing unit 306.

At S1005, by controlling the HT density correction processing unit 306, the CPU 208 obtains the correction profiles from the ROM 211 held in the LED line head 24 of each color of CMYK and the storage unit 204 and generates a correction signal for each main scanning position. The correction processing explained by using FIG. 8A, FIG. 8B, FIG. 9A, and FIG. 9B is performed sequentially for the HT image data based on the correction signal. The data for which the correction processing has been performed is delivered to the output unit 307. Details of the correction profile and the correction value will be described later.

<Detailed Configuration of HT Density Correction Processing Unit 306>

Figure 11:
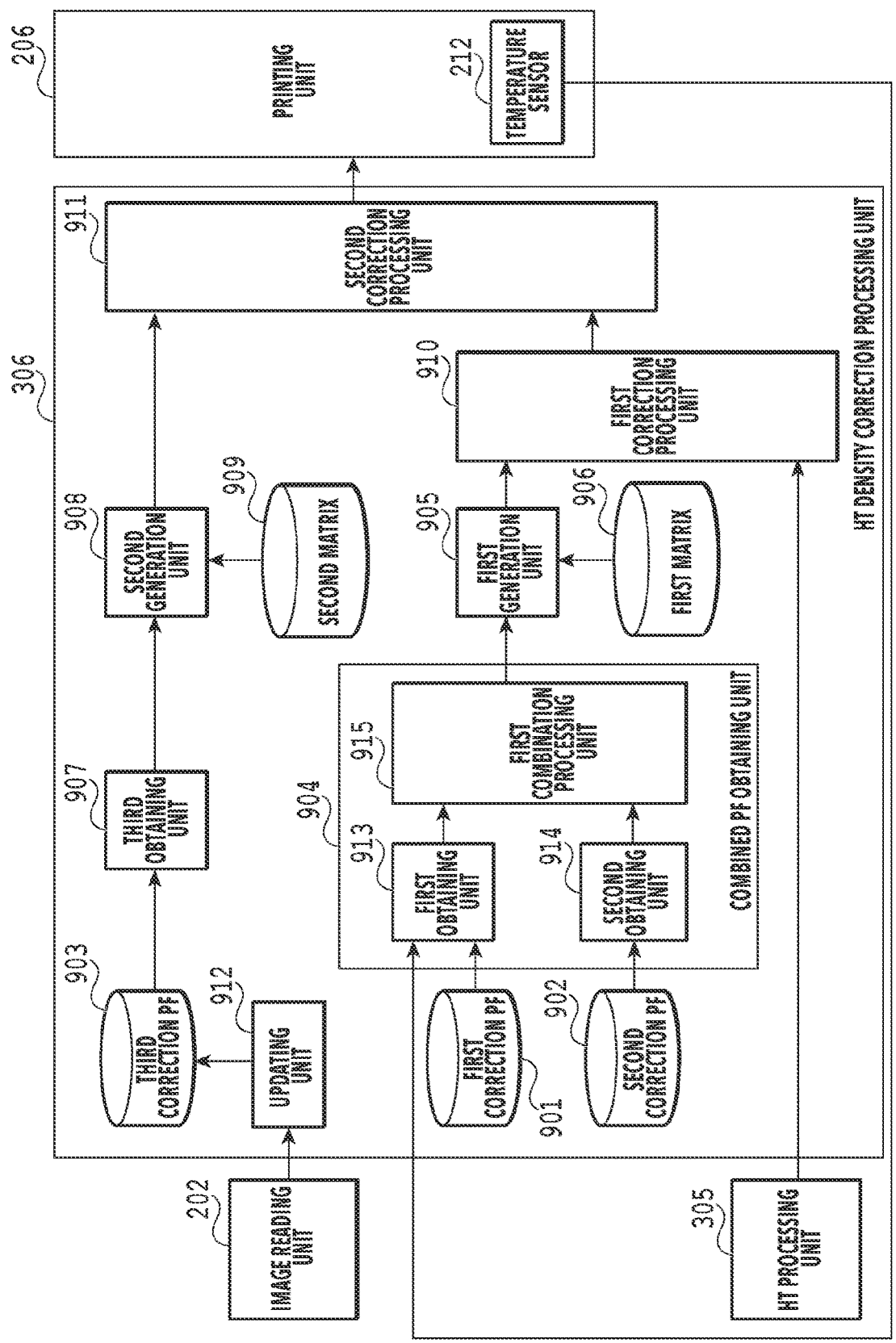
FIG. 11 is a function block diagram explaining a configuration of an HT density correction processing unit.

A configuration example of the HT density correction processing unit 306 in the present embodiment is explained by using the drawing. FIG. 11 is a function block diagram explaining the configuration of the HT density correction processing unit 306 in the present embodiment. The HT density correction processing unit 306 has the first correction profile (also referred to as first correction PF) 901, the second correction profile (also referred to as second correction PF) 902, and the third correction profile (also referred to as third correction PF) 903. The HT density correction processing unit 306 has a combined profile obtaining unit (also referred to as combined PF obtaining unit) 904, a first generation unit 905, a first correction signal matrix 906, a third obtaining unit 907, and a first correction processing unit 910. By these function units, density correction is performed based on the profile obtained by the combined profile obtaining unit 904. Further, the HT density correction processing unit 306 has a second generation unit 908, a second correction signal matrix 909, and a second correction processing unit 911. By these function units, density correction is performed based on the profile obtained by the third obtaining unit 907. Further, the HT density correction processing unit 306 has an updating unit 912. By this function unit, the third correction profile 903 is updated in accordance with a change over time.

<First, Second, Third Correction Profiles>

The first, second, and third correction profiles are explained by using the drawing. FIG. 12 is a diagram showing data examples of the first, second, and third correction profiles.

The first correction profile 901 is data holding correction values that correct variations of light amount of the light-emitting element due to the difference in transmittance of each rod lens position. In the present embodiment, as shown in FIG. 12, a first correction profile 1201 corresponding to the first correction profile 901 holds data corresponding to each of the 512 LED light-emitting elements 43 per chip of the LED chip 42. That is, it can be said that the first correction profile 901 holds data for each light-emitting element. As described above, the range is grasped in advance, in which the LED light-emitting element 43 and the rod lens deviate from the initial arrangement in accordance with the temperature within the LED line head, and a deviation amount of the correspondence relationship in accordance with the data in accordance with the number of rod lenses and the temperature is held in advance. In the present embodiment, an example is shown in which a deviation corresponding to one rod lens (four light-emitting elements) occurs at most due to the expansion and contraction of the print substrate 40. Because of this, the first correction profile 1201 holds 520 pieces of data, which is a result of adding eight pieces of data to 512 pieces of data. The data is held in four bits and to the main scanning position whose transmittance is high and whose frequency of light emission is made low in order to reduce the light amount, 15 is set. On the contrary, in a case where the transmittance is low and the frequency of light emission of the LED light-emitting element 43 is maintained, 0 is set. These figures indicate the turning-off probability.

The second correction profile 902 is data holding correction values that correct the variations of light amount of the LED light-emitting element 43 due to the difference of the current source. In the present embodiment, as shown in FIG. 12, a second correction profile 1202 corresponding to the second correction profile 902 holds one piece of data for each eight light-emitting elements. In the present embodiment, one chip of the LED chip 42 has the 512 LED light-emitting elements 43, and therefore, the second correction profile 902 holds 64 pieces of data per chip of the LED chip 42. Like the first correction profile 901, data is held in four bits and in a case where the current that is supplied from the current source is strong and the frequency of light emission of the LED light-emitting element 43 is reduced, 15 is set. On the contrary, in a case where the current is weak and the frequency of light emission of the LED light-emitting element 43 is maintained, 0 is set.

The third correction profile 903 is data holding correction values that correct the variations of light amount on the photosensitive body 22 due to the inclination of the LED line head 24 and the photosensitive body 22. In the present embodiment, as shown in FIG. 12, a third correction profile 1203 corresponding to the third correction profile 903 holds one piece of data for each 16 LED light-emitting elements. In the present embodiment, one chip of the LED chip 42 has the 512 LED light-emitting elements 43, and therefore, one chip holds 32 pieces of data. The data is held in eight bits and the correction value is determined based on the difference in density of each main scanning position by outputting a print chart in which all the LED light-emitting elements 43 are turned on (turned-on state). The correction value corresponding to the area whose distance to the LED line head 24 and the photosensitive body 22 is long and in which the light amount is small is set to 0 and the correction value corresponding to the area whose distance to the LED line head 24 and the photosensitive body 22 is short and in which the light amount is large is made larger than 0. The process of generating a correction value from the print chart is the same as the process of the updating unit 912 and this will be described later in detail with the process of the updating unit 912. The pitch of holding each correction profile and the data amount are not limited to those of the above-described example. For example, the number of corresponding LED light-emitting elements 43 may be uneven depending on the position of data. Further, it may also be possible to increase the number of bits of data. By increasing the number of bits of data, it is possible to perform correction with a finer accuracy.

The combined profile obtaining unit 904 has a first obtaining unit 913, a second obtaining unit 913, and a first combination processing unit 915. The first obtaining unit 913 selects the data area corresponding to the LED light-emitting element 43 from among the obtained first correction profile based on the first correction profile obtained from the ROM 211 within the LED line head 24 and the temperature information obtained by the temperature sensor 212. The second obtaining unit 914 obtains the second correction profile from the ROM 211 within the LED line head 24. The first combination processing unit 915 generates data obtained by combining the data selected by the first obtaining unit 913 and the data obtained by the second obtaining unit 914 for each light-emitting element. Details of the combined profile obtaining unit 904 will be described later.

The first generation unit 905 obtains a threshold value corresponding to the light-emitting element by referring to the data of each light-emitting element, which is obtained by the combined profile obtaining unit 904, and the first correction signal matrix (also referred to as first matrix) 906. Then, the first generation unit 905 generates a first correction signal for correcting HT image data based on the first and second correction profiles 901 and 902. The correction signal in the present embodiment is a signal value representing a turning-off rate for determining the pixel that is turned off stochastically, which is described in the light amount correction method by adjusting HT image data described above. In the present embodiment, the first correction signal is generated by using the data of each light-emitting element and the first correction signal matrix 906.

<First Correction Signal Matrix>

Figure 13A:
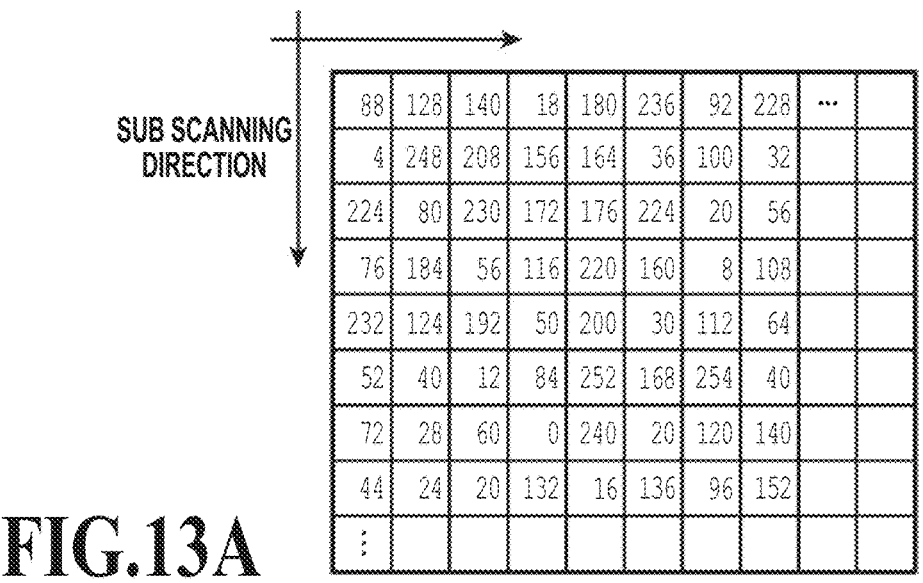
FIG. 13A and FIG. 13B are diagrams for explaining a matrix example and a use example of matrix.
Figure 13B:
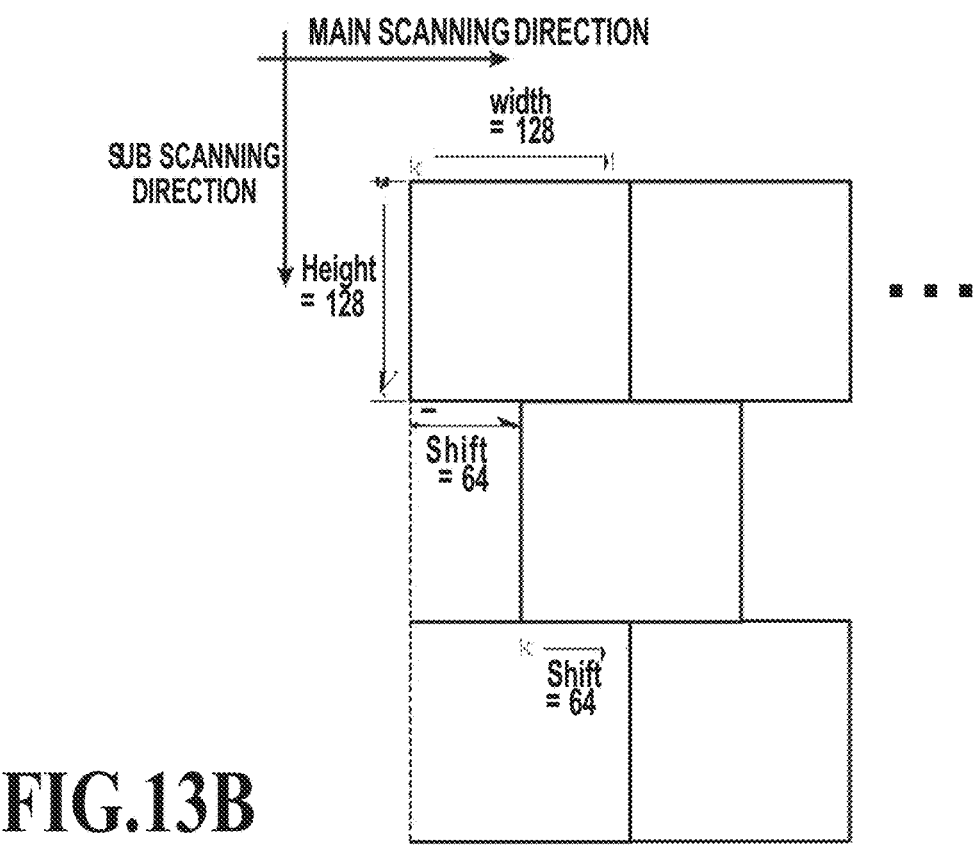

Details of the first correction signal matrix 906 are explained by using the drawings. FIG. 13A and FIG. 13B are diagrams for explaining the first correction signal matrix and a use example thereof and FIG. 13A shows an example of the first correction signal matrix and FIG. 13B shows a use example thereof. The first correction signal matrix 906 is matrix data corresponding to 128×128 pixels. The schematic diagram of the first correction signal matrix 906 is shown in FIG. 13A. In the present embodiment, the matrix data corresponding to 128×128 pixels is held. In a case where this matrix data is used, as shown in FIG. 13B, reference is made by repeatedly arranging the matrix data in the longitudinal direction and in the transverse direction based on the matrix data and the shift amount that is held together.

<Generation of First Correction Signal>

Figure 14:
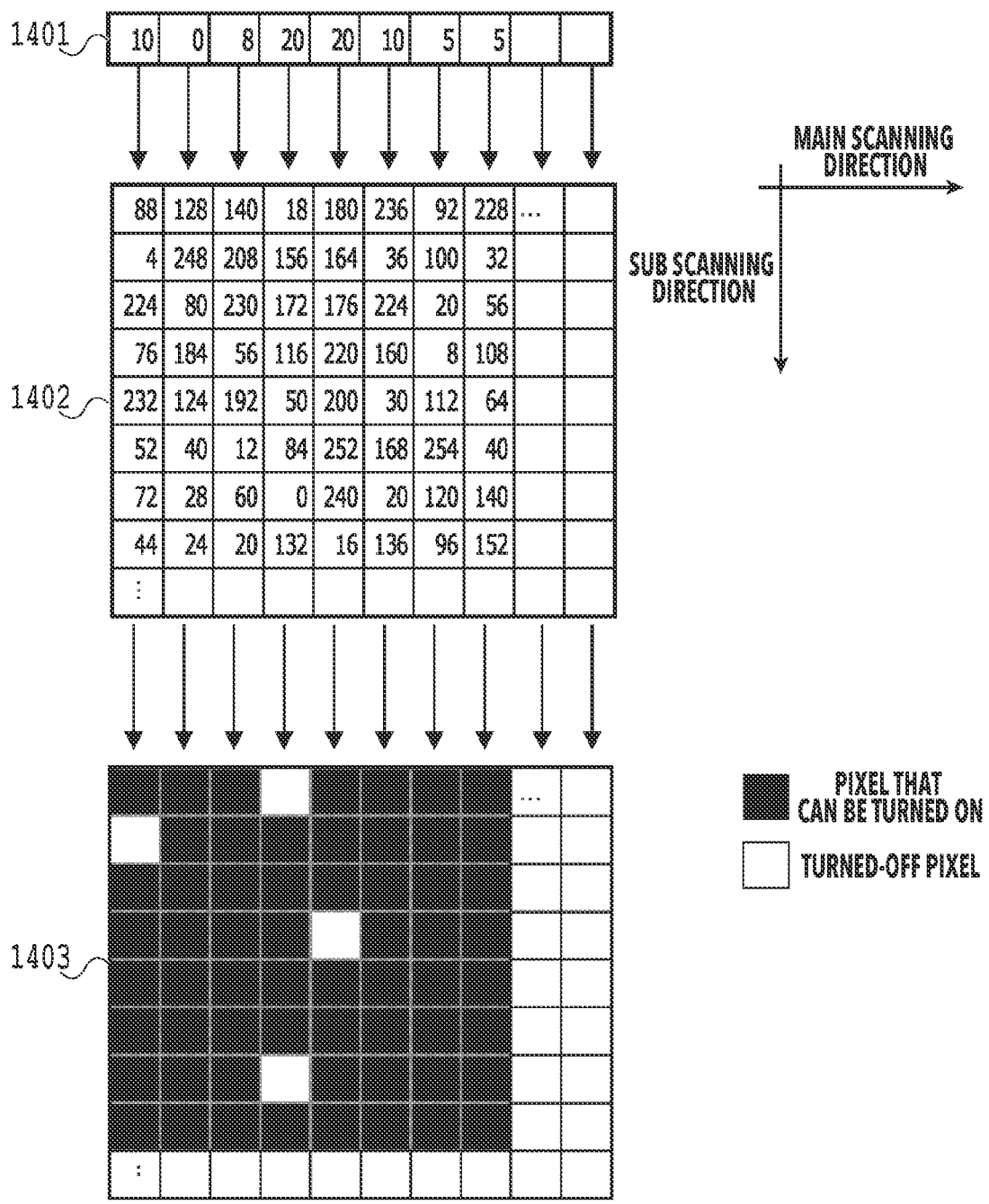
FIG. 14 is a diagram for explaining generation of a correction signal using correction data and a matrix.

The generation of the first correction signal by the first generation unit 905 is explained by using the drawing. FIG. 14 is a diagram explaining the generation of the first correction signal. A first correction signal 1403 is generated by comparing correction data 1401 of the main scanning position and a threshold value 1402 having referred to the first correction signal matrix and taking the pixel whose correction data exceeds the matrix data as a turned-off pixel (0) and taking the pixel other than the turned-off pixel as a pixel that can be turned on (1). As the matrix, a threshold value matrix having the publicly known blue noise characteristic is used. By using the blue noise characteristic, the cycle becomes a halftone dot cycle finer than that of the AM-screen-type dither matrix and the turned-off pixels are dispersed. The turned-off pixel position is determined with a fine halftone dot cycle, and therefore, it is made possible to suppress the occurrence of the break of a thin line and the unsteadiness of a character due to the light amount correction. Further, it is also made possible to suppress a striped pattern caused by the HT image data and the correction signal interfering with each other. The frequency characteristic of the matrix data is not limited to the blue noise. It is sufficient to use a dot-distribution-type matrix with which dots to be corrected are unlikely to be adjacent to each other and which does not cause the unsteadiness of a thin line and a character, and it may be possible to use a threshold value matrix having the publicly known green noise characteristic or use a threshold matrix having the pink noise characteristic.

The third obtaining unit 907 obtains the third correction profile from the storage unit 204 within the control unit 203 and performs processing to convert into data of each light-emitting element. The conversion processing is performed by the LED light-emitting element 43 obtaining the profile value of the corresponding main scanning position.

The second generation unit 908 refers to the data of each light-emitting element obtained and converted by the third obtaining unit 907 and the second correction signal matrix (also referred to as second matrix) 909. Then, the second generation unit 908 generates a second correction signal for correcting HT image data based on the third correction profile 903.

The format of the second correction signal matrix 909 is the same as that of the first correction signal matrix 906 and the difference lies in the threshold value of the matrix data that is held. The second correction signal matrix 909 has the publicly known blue noise like the first correction signal matrix 906 and uses matrix data whose phase is different from that of the first correction signal matrix 906. The second correction signal matrix 909 holds the matrix data whose phase is different so that the correction positions by the two pieces of correction processing do not overlap. The generation method of the correction data by the second generation unit 908 is the same as the generation method of the first correction signal by the first generation unit 905, and therefore, explanation is omitted.

The first correction processing unit 910 obtains HT image data from the HT processing unit 305 and obtains the first correction signal from the first generation unit 905. Then, the first correction processing unit 910 performs AND processing for the obtained HT image data and the obtained first correction signal in each pixel. That is, even in a case where the HT image data is in the turned-on state (1), on a condition that the first correction signal is the turned-off pixel (0), the first correction processing unit 910 corrects the HT image data to the turned-off state (0).

The second correction processing unit 911 obtains the HT image data for which first light amount correction has been performed from the first correction processing unit 910 and obtains the second correction signal from the second generation unit 908. Then, the second correction processing unit 911 performs AND processing for the obtained HT image data for which the first light amount correction has been performed and the obtained second correction signal in each pixel. That is, like the first correction processing, even in a case where the HT image data for which the first light amount correction has been performed is in the turned-on state (1), on a condition that the second correction signal is the turned-off pixel (0), the second correction processing unit 911 corrects the HT image data to the turned-off state (0).

The HT image data for which the first and second light amount correction have been performed sequentially is sent to the printing unit 206. Then, the printing unit 206 performs image formation on a printing medium based on the processed HT image data.

Further, the updating unit 912 updates the third correction profile 903 based on instructions of a user from the UI unit 205. That is, the updating unit 912 first reads the results of printing the calibration chart held in advance in the ROM 209 with the image reading unit 202 and obtains the density distribution of each main scanning position based on instructions of a user from the UI unit 205. Then, the updating unit 912 updates the third correction profile 903 based on the obtained density distribution of each main scanning position. The updating unit 912 updates the third correction profile 903 by calculating the correction value that reduces the frequency of light emission in the area corresponding to the area in which the density is higher than a reference, the reference being the density at the position at which the density is lowest among the main scanning positions. Details of the updating processing of the third correction profile will be described later.

<Processing Flow of HT Density Correction Processing Unit 306>

Figure 15:
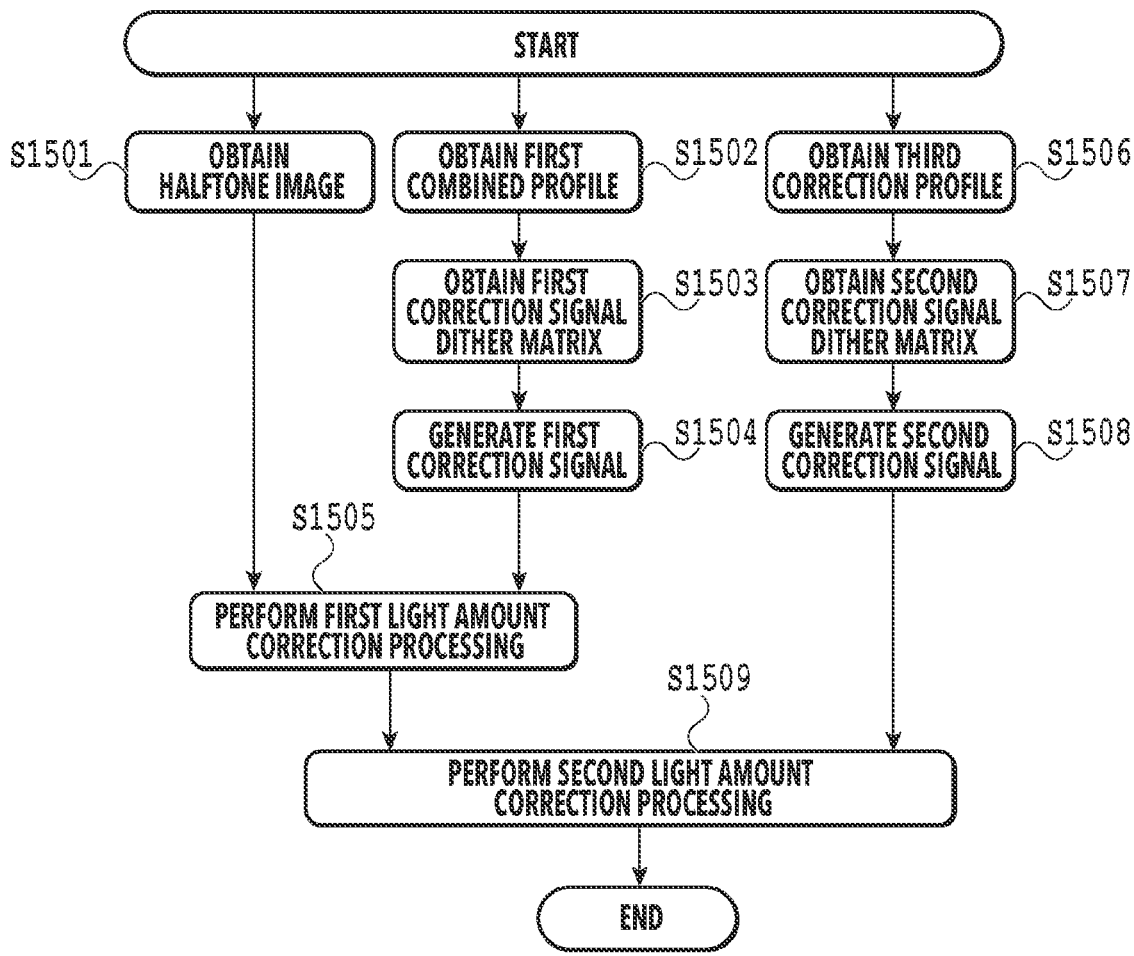
FIG. 15 is a flowchart showing a flow of processing by the HT density correction processing unit.

The processing flow of the HT density correction processing unit 306 of the present embodiment is explained by using the drawing. FIG. 15 is a flowchart showing a flow of image processing by the HT density correction processing unit 306 of the present embodiment. The processing shown in FIG. 15 is achieved by the CPU 208 reading a program stored in the ROM 209, loading the program onto the RAM 210, and executing the program. At the following S1501 to S1509, the target toner color and the pixel position are selected sequentially from the HT image data of the four colors of CMYK and processing is performed. Until the processing is completed in all the pixels, the pixel to be selected is changed and the processing is repeated.

At S1501, the CPU 208 obtains a signal value In of a processing-target pixel from the HT image data held in the RAM 210 and for which halftone processing has been performed.

At S1502, the CPU 208 obtains the first correction profile 901 and the second correction profile 902 held in the ROM 211 of the LED line head 24 and obtains information on the temperature within the LED line head 24 from the temperature sensor 212. The CPU 208 compares the obtained temperature information and the temperature information in the past stored in the storage unit 204 and determines whether a change in temperature larger than a threshold value held in advance has occurred. As the past temperature information, for example, mention is made of the temperature information held in the storage unit 204 by the processing of the previous time. In a case where the determination results that a change in temperature larger than the threshold value held in advance has occurred are obtained, from the first correction profile 901, the CPU 208 determines the data of each light-emitting element by taking into consideration the temperature information and updates the data held in the RAM 210. Further, the CPU 208 calculates a combined correction value obtained by combining data corresponding to the second correction profile 902 with the data corresponding to the first correction profile 901 held in the RAM 210 and holds the combined correction value in the RAM 210. Details of the calculation method of a combined profile will be described later.

At S1503, the CPU 208 obtains the first correction signal matrix 906 held in the RAM 210.

At S1504, the CPU 208 selects a value Coeff_1st corresponding to the main scanning position of the pixel selected as the processing target from the combined profile held in the RAM 210. Further, the CPU 208 selects a threshold value Mat_1st corresponding to the pixel position selected as the processing target from among the obtained first correction signal matrix. Then, the CPU 208 calculates a correction signal Corr-1st from this data. In the following, a pseudo code that calculates the correction signal Corr_1st is shown. The calculated results are held in the RAM 210. Both Coeff_1st and Mat_1st are held in eight bits and comparison is performed. Details of the method of calculating 8-bit Coeff_1st from the 5-bit first correction profile 901 and the second profile 902 will be described later.

Pseudo Code:

```
if (Coeff_1st > Mat_1st) {
    Corr_1st = 0;
} else {
    Corr_1st = 1;
}
```

At S1505, the CPU 208 performs AND processing for In obtained at S1501 and Corr_1st and calculates HT image data In_trim for which the correction by the first correction signal has been performed. That is, the first light amount correction processing is performed. The calculated result is held in the RAM 210.

At S1506, the CPU 208 obtains the third correction profile 903 that is held in the storage unit 204. Further, the CPU 208 refers to data corresponding to each light-emitting element and converts into data of each light-emitting element. Furthermore, the CPU 208 refers to correction data ProcCoeff corresponding to each light-emitting element and converts into correction data ProcCoeff_full of each light-emitting element. The converted correction data ProcCoeff_full of each light-emitting element is held in the RAM 210. For example, the conversion is performed by using formula (1) below. Here, x represents the main scanning position.

$$\text{ProcCoeff\_full}[x] = \text{ProcCoeff}[x/16] \quad (1)$$

At S1507, the CPU 208 obtains the second correction signal matrix 909 held in the RAM 210.

At S1508, the CPU 208 selects a value Coeff_2nd corresponding to the pixel position selected as the processing target from data corresponding to the third correction profile 903 held in the RAM 210. Further, the CPU 208 selects a threshold value Mat_2nd corresponding to the pixel position selected as the processing target from the obtained second correction signal matrix 909. Then, the CPU 208 calculates a correction signal Corr_2nd from this data. The calculation method is the same as that of the pseudo code at S1504, and therefore, explanation thereof is omitted.

At S1509, the CPU 208 performs AND processing for In_trim calculated at S1505 and Corr_2nd and calculates HT image data In_trim_2nd for which the correction by the second correction signal has been performed. That is, second light amount correction processing is performed. The HT image data In_trim_2nd for which the correction by the second correction signal has been performed, which is the calculated result, is sent to the printing unit 206.

In the above. S1501 and S1502 to S1504 are performed in parallel, but this is not limited, For example, it may be possible to sequentially perform S1501 to S1504. In the above, S1501 to S1505 and S1506 to S1508 are performed in parallel, but this is not limited. For example, it may also be possible to sequentially perform S1501 to S1508.

<Detailed Processing Flow of Combined Profile Obtaining Processing at S1502>

Figure 16:
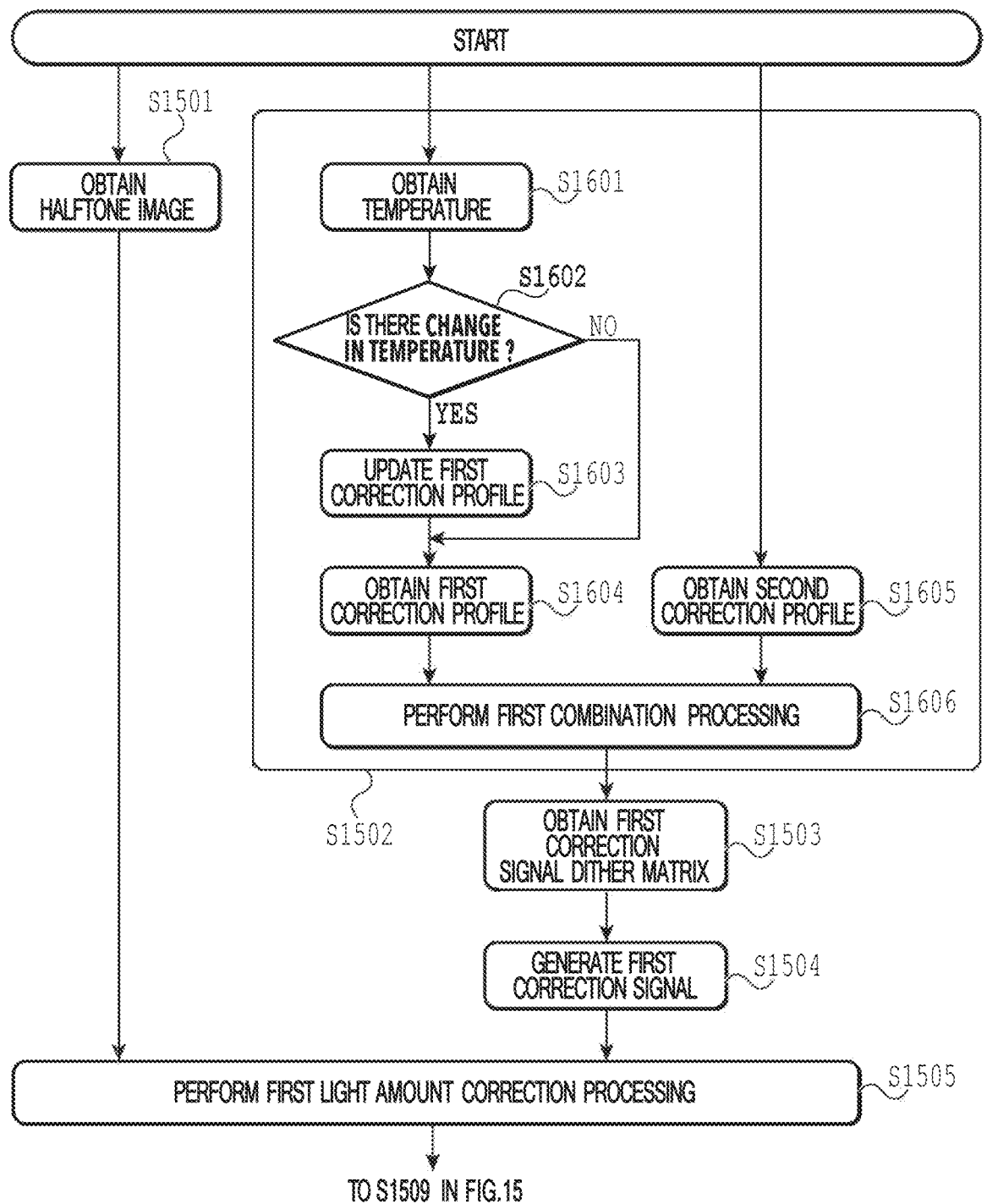
FIG. 16 is a flowchart showing a detailed flow of processing by a combined profile obtaining unit.

Details of the processing (S1502) of the combined profile obtaining unit 904 are explained by using the drawing. FIG. 16 is a flowchart showing a detailed flow of the processing by the combined profile obtaining unit 904.

At S1601, the CPU 208 obtains temperature information from the temperature sensor 212, which the temperature sensor 212 has obtained by measuring the temperature within the LED line head 24.

At S1602, the CPU 208 compares the temperature information obtained at S1601 and the past temperature information held in advance in the storage unit 204 and determines whether a temperature difference at a level at which the print substrate 40 expands or contracts has occurred. As the past temperature information, for example, mention is made of the temperature information held in the storage unit 204 by the processing of the previous time. In a case where the determination results indicate that a temperature difference at a level at which the print substrate 40 expands or contracts has occurred and a change in temperature has occurred (YES at S1602), the processing is moved to S1603. On the other hand, in a case where a temperature difference at a level at which the print substrate 40 expands or contracts has not occurred and there is no change in temperature (NO at S1602), the processing skips S1603 and the processing is moved to S1604.

At S1603, the CPU 208 obtains a deviation amount between the rod lens and the LED light-emitting element 43 in accordance with the temperature information obtained at S1601 and the temperature information that is held in the ROM 211 of the LED line head 24. Then, the CPU 208 selects the correction value corresponding to the current LED light-emitting element 43 from the first correction profile 901 and updates the correction data held in the RAM 210. The deviation amount in accordance with the temperature information is held in the same units as those of the main scanning resolution. The CPU 208 selects the correction value by taking the main scanning position as the start position, which is the initial correspondence relationship start position shifted by the deviation amount. Further, the CPU 208 updates the temperature information held in the storage unit 204 to the most recent information.

At S1604, the CPU 208 obtains the first correction profile 901 of each light-emitting element, which has already been selected and held in the RAM 210.

At S1605, the CPU 208 obtains the second correction profile 902 held in the ROM 211 of the LED line head 24. Further, the CPU 208 refers to correction data PowCoeff corresponding to each light-emitting element and converts into correction data PowCoeff_full of each light-emitting element and holds in the RAM 210. For example, the conversion is performed by using formula (2) below. Here, x represents the main scanning position.

$$PowCoeff\_full[x]=PowCoeff[x/8] \qquad (2)$$

At S1606, the CPU 208 calculates a combined correction value TotalCoeff [x], which is combined information, by using a pseudo code below based on data shown below. The calculation processing of the combined correction value TotalCoeff [x] is performed based on data shown below. That is, the calculation processing is performed based on data LensCoeff[x] corresponding to the first correction profile 901 obtained at S1604 and data PowCoeff_full [x] corresponding to the second correction profile 902 obtained at S1605. Here, x represents the main scanning position. The calculation is performed for each main scanning position.

First, the CPU 208 converts the correction value LensCoeff [x] of the lens transmittance, which is data corresponding to the first correction profile 901 obtained at S1604, into a light amount equivalent value Lumi that takes into consideration the lens transmittance. The smaller the amount of light having been emitted from the LED light-emitting element 43 and passed through the rod lens, the smaller the correction value is. That is, the correction value and the light amount is in an inverse proportion relationship. Because of this, by inverting the correction value, the light amount equivalent value is found.

Next, the CPU 208 converts the correction value PowCoeff_full [x] due to the variations of the current source into a light amount correction rate Rate that takes into consideration a difference in current. The smaller the current to the LED light-emitting element 43, the smaller the correction value is. That is, like LensCoeff, the correction value and the light amount correction rate are in an inverse proportion relationship. Because of this, by inverting the correction value, a light amount correction rate equivalent value is found.

Next, the CPU 208 determines the combined correction value TotalCoeff [x] based on a correction light amount (LimiTrim) corrected by multiplying the light amount and a light amount adjustment rate. Further, at the time of determining TotalCoeff [x], the CPU 208 multiplies the combined correction value by an adjustment value Gain. The combined correction value has the adjustment value Gain for extending the corrected resolution caused by that the data amount held in the correction profile is small. In a case where the corrected resolution is sufficient, 1 is set. In a case where the corrected resolution is insufficient, a value larger than or equal to 1 is set.

Lastly, the CPU 208 performs clip processing so that TotalCoeff [x] is included in eight bits, which is the threshold value range held in the first correction signal matrix 906.

Pseudo Code:

```
Lumi = 16 – LensCoeff [x]                //correction value → light amount
Rate = (16 – PowCoeff_full [x] ) / 16    //correction value → rate
LumiTrim = Lumi × Rate                   //corrected light amount = light amount
   × rate
   TotalCoeff [x] = (16 – LumiTrim) × Gain   //corrected light amount
→ combined correction value
   if (TotalCoeff [x] > 255) {TotalCoeff [x] = 255}
```

The first correction profile 901 and the second correction profile are the causes of the variations of light amount resulting from the same LED line head 24. That is, they are in a relationship in which in a case where the condition of one of them changes, the cycle of the variations due to the other cause remains the same and only the amplitude changes. Because of this, the combined correction value, which is combined information, is generated by multiplying the two conditions.

In the above. S1601 to S1604 and S1605 are performed in parallel, but this is not limited. For example, it may also be possible to sequentially perform S1601 to S1605.

<Processing Flow of Updating Unit 912>

Figure 17:
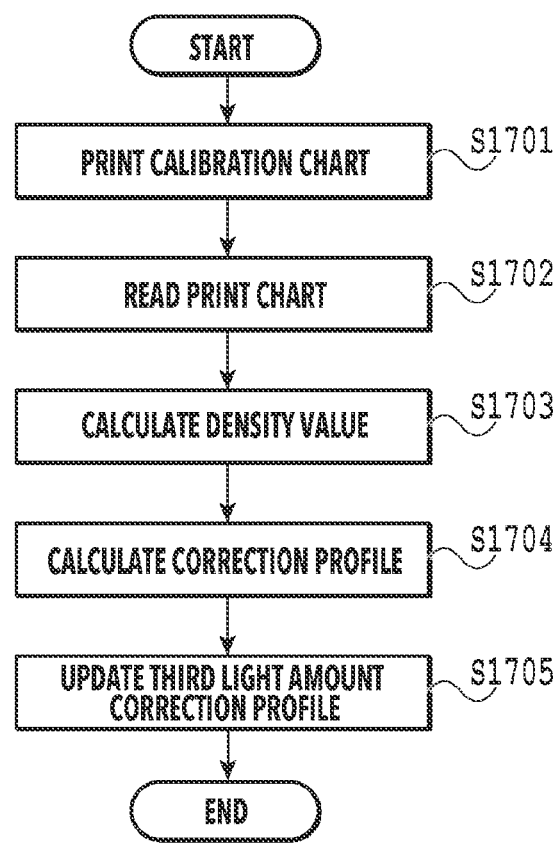
FIG. 17 is a flowchart showing a detailed flow of processing to update a third correction profile.

Details of the processing by the updating unit 912 are explained by using the drawing. FIG. 17 is a flowchart showing a detailed flow of the processing to update the third correction profile by the updating unit 912. The processing shown in FIG. 17 is achieved by the CPU 208 reading a program stored in the ROM 209, loading the program onto the RAM 210, and executing the program. The following processing is performed based on calibration instructions of a user, which are input via the UI unit 205. For example, it is necessary to perform calibration at the time of exchange of parts including the photosensitive body 22 or in a case where printing of the number of sheets larger than or equal to a predetermined number is performed and there is a change over time on the surface of the photosensitive body. Because of this, it is desirable to display a notification prompting a user to perform calibration on the UI unit 205 at the above-described timing.

Figure 18:
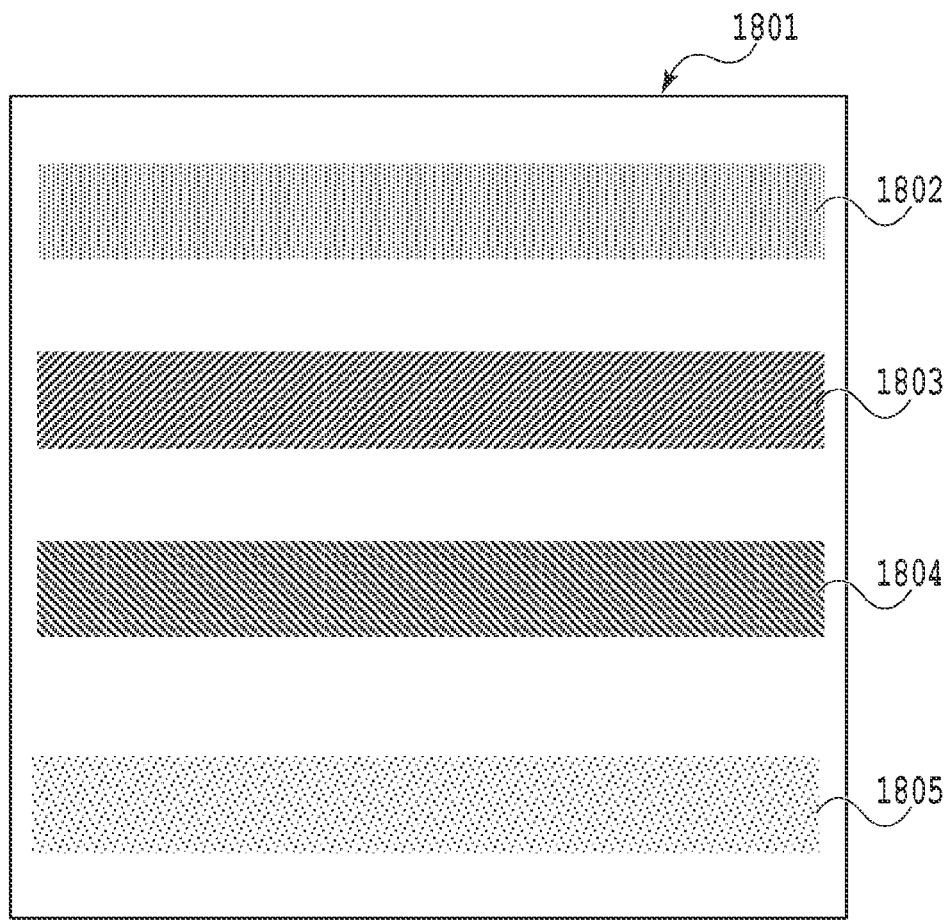
FIG. 18 is a schematic diagram of a calibration chart.

At S1701, the CPU 208 prints a calibration chart 1801 held in the ROM 209 by the printing unit 206. The calibration chart is explained by using the drawing. FIG. 18 is a schematic diagram of the calibration chart 1801. As shown in FIG. 18, in the calibration chart 1801, patches 1802, 1803, 1804, and 1805 represent differences of color material to be printed. In the present embodiment, the patch 1802 holds print data for performing printing by using C (Cyan) as the calibration chart 1801, and similarly, the patch 1803 does so for performing printing by using M (Magenta), the patch 1804 does so for performing printing by using Y (Yellow), and the patch 1805 does so for performing printing by using K (Black). As shown in FIG. 8A, in each patch, all the pixels within the patch are turned-on pixels of each color material. In the present embodiment, only the example is shown in which all the signal values of each patch are turned-on pixels, but the example is not limited to this. It may also be possible to use a calibration chart including a halftone patch in which the percentage of turned-on pixels is less than 100%.

At S1702, the CPU 208 reads the printed material of the calibration chart (print chart) 1801 that is output at S1701 by the image reading unit 202 and holds the signal values, which are the results of reading, in the RAM 210.

At S1703, the CPU 208 converts the read signal value held in the RAM 210 into a density value of each main scanning position by using the conversion formula held in the ROM 209. In the present embodiment, the resolution of the image reading unit 202 is 600 dpi and the CPU 208 calculates the density value in units of 600 dpi of main scanning and holds the density value in the RAM 210. That is, in the present embodiment, correction data is generated so that the variations of density are reduced by taking one pixel whose resolution of main scanning is 600 dpi as a predetermined area. The resolution of the predetermined area is an example and the resolution is not limited to that in the above-described example. It may also be possible to use a read signal value whose resolution is high in order to correct finer streak unevenness.

At S1704, the CPU 208 calculates a correction profile. That is, the CPU 208 calculates an updated value ProcCoeff [subx] of the third correction profile in units of 150 dpi of main scanning based on a density value Dens [scanx] [comp] in units of 600 dpi of main scanning, which is held in the RAM 210. In the following, a pseudo code to calculate the correction profile is shown. Here, scanx represents the main scanning position in units of 600 dpi, subx represents the main scanning position in units of 150 dpi, and comp represents the ID of color material. The calculated updated value ProcCoeff [subx] is held in the RAM 210.

Pseudo Code.

```
for (int c = 0; c < 4; c++) {//repeated by four colors of CMYK
   min = Dens [0] [c] ;
      for (int scanx = 1;   scanx < width_600; scanx++) {//width_600 : main
scanning position maximum value in units of 600 dpi
         if (min > Dens [x] [c])
            min = Dens [x] [c];
      }
   }
      for (int subx = 0; subx < width_150; subx + =3) {//width_150 : main
scanning position maximum value in units of 150dpi
         sum = 0 ;
         for (int i = 0; i < 4; i++) {sum = Dens [subx*4 + i] [c] – min;}
         ProcCoeff [subx] = sum / 4;
      }
   }
}
```

Lastly, at S1705, the CPU 208 updates the value of the third correction profile held in the storage unit 204 with the updated value ProcCoeff [subx] held in the RAM 210.

As explained above, in the present embodiment, the CPU 208 performs the correction processing to suppress the occurrence of the variations of light amount on the photosensitive body, which is shown next, for the HT image data for which the halftone processing has been performed. That is, the CPU 208 performs the correction processing to suppress the occurrence of the variations of light amount on the photosensitive body based on the correction signal created by using the dot-distribution-type matrix capable of turning off the pixel at a frequency higher than that of the AM-screen-type dither matrix that is used in the halftone processing. Because of this, it is made possible to perform the correction processing without being affected by the low-cycle dither matrix that is used in the halftone processing, and therefore, it is made possible to suppress the occurrence of the brake of a thin line and the unsteadiness of a character. Further, the correction profile is held for each cause of the occurrence of the variations of light amount, and therefore, it is also possible to suppress the processing cost of updating of the correction profile. That is, it is possible to suppress the occurrence of density unevenness due to the variations of light amount on the photosensitive body.

In the present embodiment, the example is described in which the two pieces of light amount correction are performed after the halftone processing, but the number of pieces of light amount correction is not limited to this. It may also be possible to add another piece of correction processing and perform the correction processing after the second correction processing.

Second Embodiment

Figure 19:
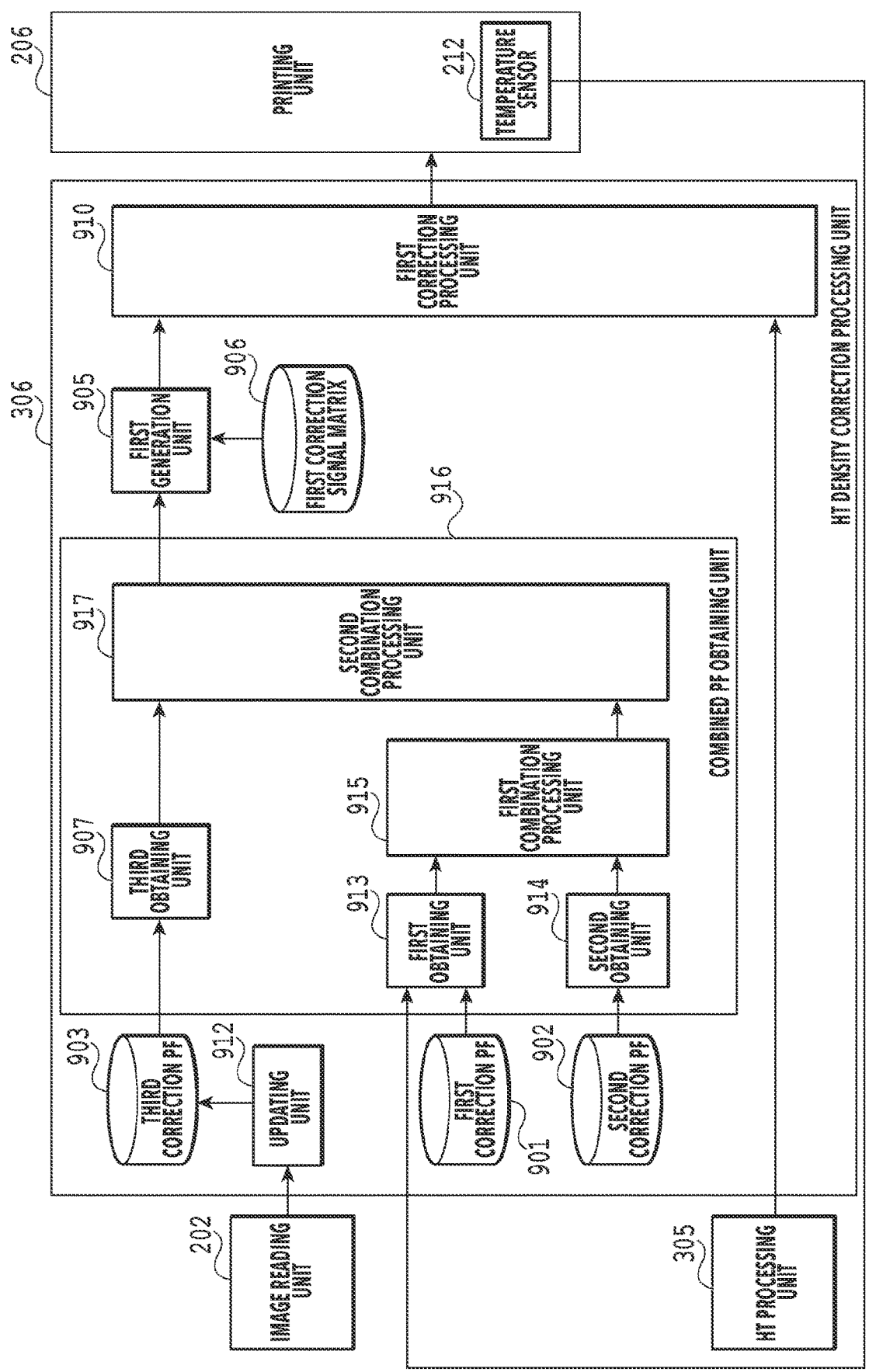
FIG. 19 is a function block diagram explaining a configuration of the HT density correction processing unit.

The image forming apparatus according to the present embodiment is explained by using the diagram. However, in the present embodiment, points different from the first embodiment are explained mainly. FIG. 19 is a function block diagram explaining the configuration of the HT density correction processing unit 306 of the image forming apparatus according to the present embodiment.

In the present embodiment, an aspect is explained in which correction profiles corresponding to different causes are combined in advance and the correction processing is integrated into one piece of correction processing using the combined profile. The present embodiment differs from the first embodiment in that the combined profile obtaining unit 904 configured to calculate the combined correction value of each light-emitting element is replaced with a combined profile obtaining unit 916 including the third obtaining unit 907. Further, the present embodiment differs from the first embodiment in that only the one first generation unit 905 is provided as the correction signal value generation unit and also only the one first correction processing unit 910 is provided as the light amount correction unit.

The HT density correction processing unit 306 of the present embodiment has the first correction profile 901, the second correction profile 902, the third correction profile 903, the first generation unit 905, the first correction signal matrix 906, and the first correction processing unit 910. The HT density correction processing unit 306 of the present embodiment further has the combined profile obtaining unit 916. The combined profile obtaining unit 916 has the third obtaining unit 907, the first obtaining unit 913, the second obtaining unit 914, the first combination processing unit 915, and a second combination processing unit 917.

The combined profile obtaining unit 916 performs processing below after calculating a first combined profile obtained by combining the first and second correction profiles 901 and 902 as in the first embodiment. That is, the combined profile obtaining unit 916 (second combination processing unit 917) generates a second combined profile obtained by combining the first combined profile and the third correction profile 903. The processing after generating the second combined profile is the same as that in the first embodiment, and therefore, explanation is omitted.

<Processing Flow of HT Density Correction Processing Unit>

Figure 20:
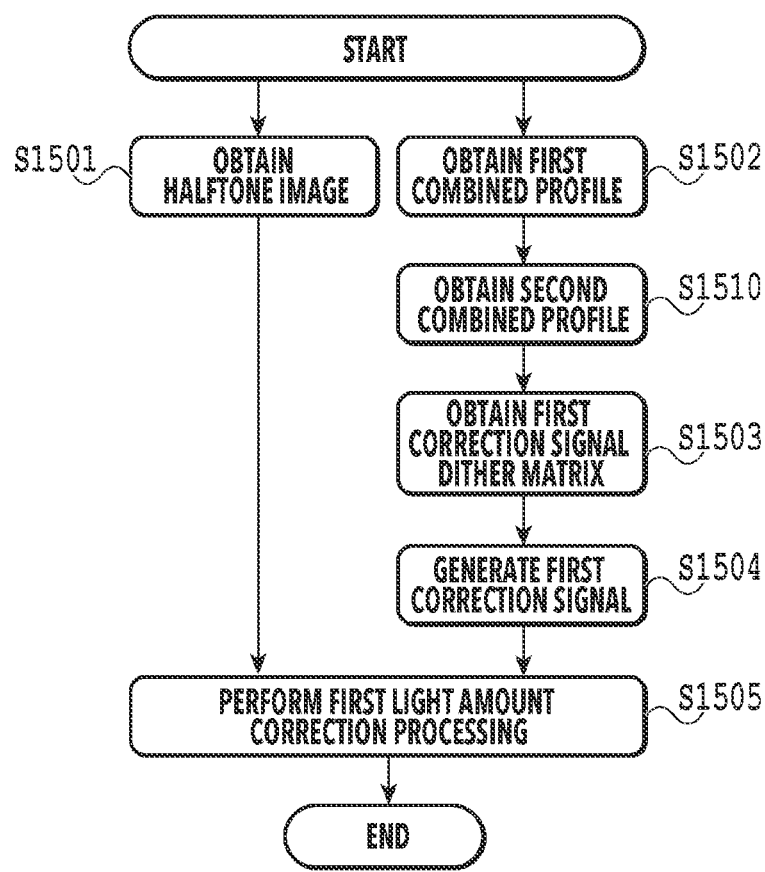
FIG. 20 is a flowchart showing a flow of processing by the HT density correction processing unit.

The processing flow of the HT density correction processing unit 306 of the present embodiment is explained by using the drawing. FIG. 20 is a flowchart showing image processing by the HT density correction processing unit 306 of the present embodiment. The processing shown in FIG. 20 is achieved by the CPU 208 reading a program stored in the ROM 209, loading the program onto the RAM 210, and executing the program. In the present embodiment, after the processing at S1502 is performed, processing at S1510 is performed, which is different from that of the first embodiment. Then, after the processing at S1510 is performed, as in the first embodiment, the processing at S1503, S1504, and S1505 is performed.

At S1510, the CPU 208 calculates the second combined profile by combining the combined profile calculated at S1502 and the third correction profile 903 obtained at S1607 whose details will be described later. The calculated second combined profile is held in the RAM 210. Details of the processing at S1510 are explained by using the drawing.

<Detailed Processing Flow of Combined Profile Obtaining Processing at S1502, S1510>

Figure 21:
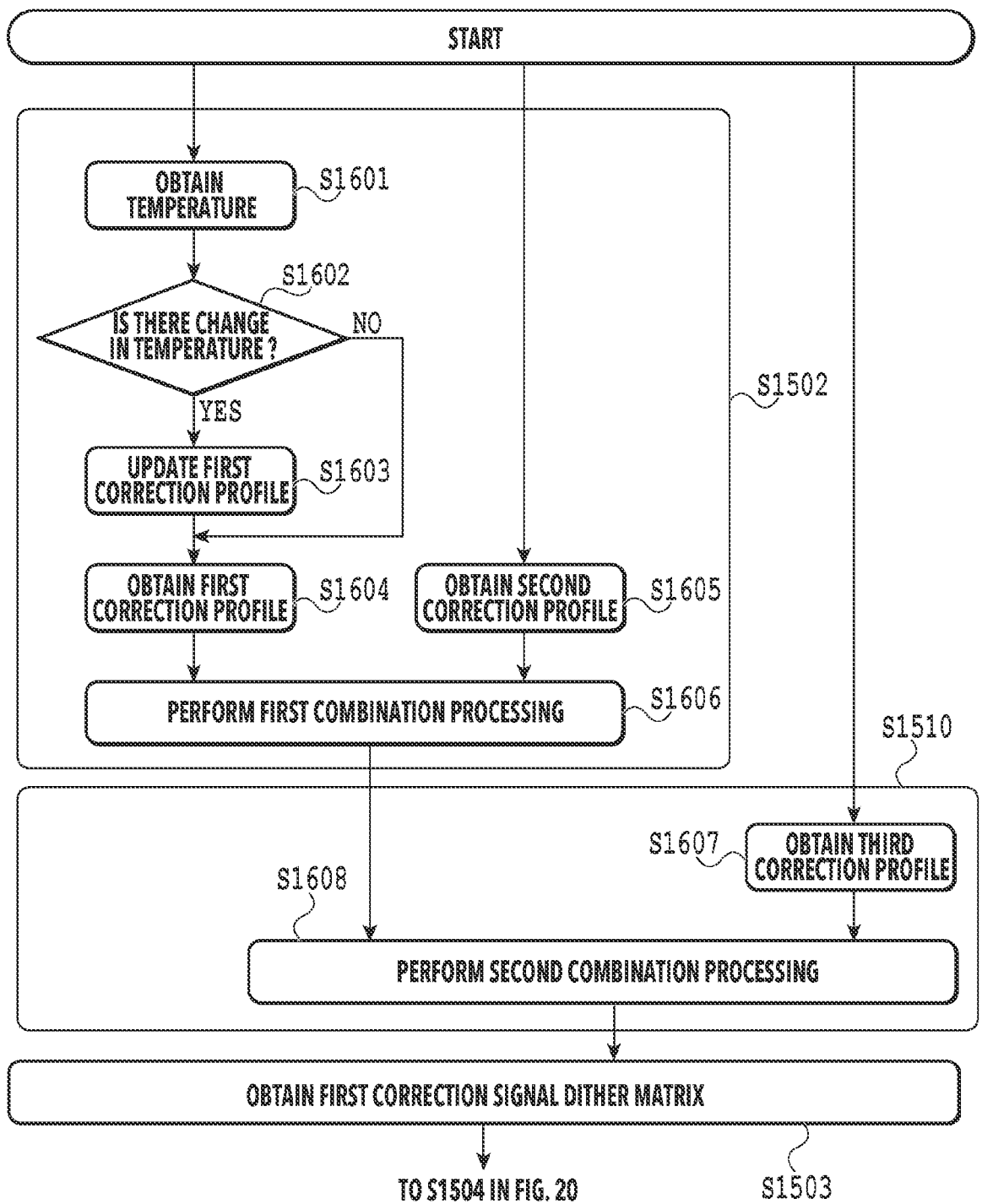
FIG. 21 is a flowchart showing a detailed flow of processing by the combined profile obtaining unit.

Details of the processing (S1502, S1510) of the combined profile obtaining unit 916 are explained by using the drawing. FIG. 21 is a flowchart showing a detailed flow of the processing by the combined profile obtaining unit 916. S1607 and S1608 different from those of the first embodiment are explained.

At S1607, the CPU 208 obtains the third correction profile 903 held in the storage unit 204. At S1608, the CPU 208 performs second combination processing by using the combined correction value TotalCoeff [x] calculated at S1502 and ProcCoeff_full [x] obtained by converting the third correction profile 903 obtained at S1607 for each light-emitting element. That is, the CPU 208 calculates a second combined value TotalCoeff_2nd [x] by performing addition processing as shown in formula (3) below for the combined correction value TotalCoeff [x] and the corrected data ProcCoeff_full [x] converted for each light-emitting element. That is, it can also be said that the second combined value TotalCoeff_2nd [x] is combined information. Here, x represents the main scanning position. The calculation is performed for each main scanning position. TotalCoeff [x] and ProcCoeff_full [x] are converted in advance into 8-bit data of each light-emitting element. The CPU 208 performs clip processing so that TotalCoeff_2nd [x] is included in eight bits, which is the threshold value range that is held in the first correction signal matrix 906.

$$TotalCoeff\_2nd[x] = TotalCoeff[x] + ProcCoeff\_full[x] \qquad (3)$$

The combined profile calculated at S1502 and the third correction profile 903 are causes of the variations of light amount resulting from different phenomena. That is, they are in a relationship in which even in a case where the condition of one of them changes, the cycle and amplitude of the variations due to the other cause are not affected. Because of this, the second combined correction value, which is combined information, is generated by adding the two conditions.

As explained above, according to the present embodiment, it is also made possible to suppress the interference due to the correction processing between different correction profiles, in addition to the influence of the dither matrix used for the halftone processing, and therefore, it is made possible to more suppress the deterioration of the image quality due to the correction processing of the variations of light amount.

Third Embodiment

The image processing apparatus according to the present embodiment is explained by using the drawing. However, in the present embodiment, points different from the first and second embodiments are explained mainly. In the first and second embodiments, the example is explained in which the matrix for generating the correction signal is held in common for each color of CMYK. However, in a case where the correction signal is generated by using the matrix common to CMYK, the turning off by the correction occurs at the same position and the paper white is exposed. In a case where the paper white is exposed, the turning off by the correction becomes more likely to be visually recognized.

In the present embodiment, an aspect is explained in which the position of the pixel to be turned off is shifted for each color. As the method of shifting the position of the pixel to be turned off for each color, for example, it may also be possible to use a method of switching matrixes to be referred to for each color by having a plurality of kinds of matrix whose phase is different in correspondence to each color plane within the printing unit 206. Alternatively, as the method of shifting the position of the pixel to be turned off for each color, it may also be possible to use the method of shifting the reference start position of the matrix so that the phase is different for each color by using a processing unit that is provided and configured to shift the reference start position (reference basis position) of the matrix so that the phase is different for each color.

The example in which the phase is changed by shifting the reference start position is explained by using the drawings. FIG. 22A to FIG. 22D are diagrams for explaining a correspondence relationship between matrix data, HT image data, and threshold values. FIG. 22A shows a case where a reference start position 2201 is at the position of a threshold value 16 and FIG. 22B shows a case where the correspondence relationship between the HT image data and the threshold values is determined by taking into consideration the shift amount of the matrix data in FIG. 22A. FIG. 22C shows a case where the reference start position 2201 is at the position of a threshold value 32 and FIG. 22D shows a case where the correspondence relationship between the HT image data and the threshold values is determined by taking into consideration the shift amount of the matrix data in FIG. 22C. For simplification of explanation, explanation is given on the assumption that the matrix size is 8×8. The reference start position 2201 is taken as the origin (main scanning position=0, sub scanning position=0) of the matrix and based on the shift amount that is held together with the matrix data, reference is made by repeatedly arranging the matrix data in the longitudinal direction and in the transverse direction.

By changing the reference start position 2201, it is made possible to refer to the matrix whose phase is different from the same matrix data as shown in FIG. 22B and FIG. 22D.

As explained above, according to the present embodiment, it is made possible to prevent the pixel to be turned off from overlapping another pixel for each color of CMYK, in addition to the influence of the dither matrix used for the halftone processing, and therefore, it is made possible to more suppress the deterioration of the image quality due to the correction processing of the variations of light amount.

Further, in the first and second embodiments, the example is described in which the reference start position 2201 of the matrix for generating the correction signal is always the same, but the example is not limited to this. It is known that the LED light-emitting element 43 deteriorates and the emitted light amount is reduced as the turned-on time lengthens. In a case where there is a difference in the turned-on time among a plurality of light-emitting elements of the LED line head 24, deterioration advances locally and streak unevenness occurs. In a case where the reference start position 2201 of the correction signal matrix is fixed at all times irrespective of the number of printed sheets, the state where the specific LED light-emitting element 43 is likely to be turned off continues, and therefore, a difference in the turned-on time is likely to occur. Consequently, it may also be possible to provide a processing unit configured to change the reference start position 2201 of the matrix in the main scanning direction at timing at which one of page and job changes, such as between pages, at the time of activation, and between jobs.

Further, it may also be possible to provide a processing unit having a plurality of matrixes whose phases are different and configured to switch the matrixes to be referred to at timing at which one of page and job changes

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiments, it is possible to suppress the occurrence of density unevenness due to the variations of light amount on the photosensitive body.

This application claims the benefit of Japanese Patent Application No. 2022-032853, filed Mar. 3, 2022, which is hereby incorporated by reference herein in its entirety.

What is claimed is:

1. An electrophotographic image forming apparatus that utilizes a line head in which a plurality of light-emitting elements is arranged as a light source, the apparatus comprising:
   a processor and a memory, the processor configured to cause, by executing a computer program stored in the memory, the electrophotographic image forming apparatus to:
      obtain print data for the electrophotographic image forming apparatus to perform printing;
      perform halftone processing for the obtained print data;
      generate a plurality of pieces of correction information for correcting variations of light amount on a photosensitive body by light radiated from the plurality of light-emitting elements; and
      correct the print data for which the halftone processing has been performed by using the correction information, wherein
   the plurality of pieces of correction information includes a first profile for correcting the variations of light amount resulting from the light-emitting elements, a second profile for correcting the variations of light amount resulting from an individual difference of a current source of the light-emitting elements, and a third profile for correcting the variations of light amount resulting from a positional relationship between the line head and the photosensitive body.

2. The electrophotographic image forming apparatus according to claim 1, wherein
   the correction information has a halftone dot cycle finer than a halftone dot cycle that occurs in the print data for which halftone processing has been performed.

3. The electrophotographic image forming apparatus according to claim 1, wherein
   the plurality of pieces of correction information holds correction values for determining a probability of turning off different units of light-emitting elements.

4. The electrophotographic image forming apparatus according to claim 1, wherein the processor further causes the electrophotographic image forming apparatus to update at least one or more pieces of correction information among the plurality of pieces of correction information.

5. The electrophotographic image forming apparatus according to claim 4, wherein
   the processor further causes the electrophotographic image forming apparatus to perform the updating at timing different for each of the plurality of pieces of correction information.

6. The electrophotographic image forming apparatus according to claim 5, wherein
   the timing of the updating is based on one of calibration instructions from a user and a change in a state of the line head.

7. The electrophotographic image forming apparatus according to claim 1, wherein
   the processor further causes the electrophotographic image forming apparatus to generate the correction information based on a matrix held in advance and a profile held in advance.

8. The electrophotographic image forming apparatus according to claim 7, wherein
   a reference basis position at which the matrix is referred to is changed at timing at which one of a toner color, a page, and a job changes.

9. The electrophotographic image forming apparatus according to claim 7, wherein
   as the matrix, a plurality of matrixes whose phases are different is held, and
   a matrix that is referred to is changed at timing at which one of a toner color, a page, and a job changes.

10. The electrophotographic image forming apparatus according to claim 1, wherein
    the processor further causes the electrophotographic image forming apparatus to obtain the print data for which halftone processing has been performed by performing halftone processing for the obtained print data.

11. A control method of an electrophotographic image forming apparatus that utilizes a line head in which a plurality of light-emitting elements is arranged as a light source, the control method comprising:
    an obtaining step of obtaining print data for the electrophotographic image forming apparatus to perform printing;
    a halftone processing step of performing halftone processing for the obtained print data;
    a generation step of generating a plurality of pieces of correction information for correcting variations of light amount on a photosensitive body by light radiated from the plurality of light-emitting elements; and
    a correction step of correcting the print data for which the halftone processing has been performed by using the correction information, wherein
    the plurality of pieces of correction information includes a first profile for correcting the variations of light amount resulting from the light-emitting elements, a second profile for correcting the variations of light amount resulting from an individual difference of a current source of the light-emitting elements, and a third profile for correcting the variations of light amount resulting from a positional relationship between the line head and the photosensitive body.

12. A non-transitory computer readable storage medium storing a program for causing a computer to execute a control method of an electrophotographic image forming apparatus that utilizes a line head in which a plurality of light-emitting elements is arranged as a light source, the control method comprising:
    an obtaining step of obtaining print data for the electrophotographic image forming apparatus to perform printing;
    a halftone processing step of performing halftone processing for the obtained print data;
    a generation step of generating a plurality of pieces of correction information for correcting variations of light amount on a photosensitive body by light radiated from the plurality of light-emitting elements; and
    a correction step of correcting the print data for which the halftone processing has been performed by using the correction information, wherein
    the plurality of pieces of correction information includes a first profile for correcting the variations of light amount resulting from the light-emitting elements, a second profile for correcting the variations of light amount resulting from an individual difference of a current source of the light-emitting elements, and a third profile for correcting the variations of light amount resulting from a positional relationship between the line head and the photosensitive body.

* * * * *